(12) United States Patent
Ikeuchi et al.

(10) Patent No.: US 7,529,965 B2
(45) Date of Patent: May 5, 2009

(54) PROGRAM, STORAGE CONTROL METHOD, AND STORAGE SYSTEM

(75) Inventors: Kazuhiko Ikeuchi, Kawasaki (JP); Mikio Ito, Kawasaki (JP); Hidejiro Daikokuya, Kawasaki (JP); Yuji Noda, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 671 days.

(21) Appl. No.: 11/102,802

(22) Filed: Apr. 11, 2005

(65) Prior Publication Data

US 2006/0117216 A1   Jun. 1, 2006

(30) Foreign Application Priority Data

Nov. 10, 2004   (JP) .............................. 2004-325939

(51) Int. Cl.
*G06F 11/00*   (2006.01)
(52) U.S. Cl. .................................... 714/5; 714/6; 714/7
(58) Field of Classification Search ...................... 714/5, 714/6, 7
See application file for complete search history.

(56) References Cited

U.S. PATENT DOCUMENTS

| | | | |
|---|---|---|---|
| 2004/0225914 A1 * | 11/2004 | Burton et al. ................. | 714/13 |
| 2006/0112302 A1 * | 5/2006 | Cherian ......................... | 714/6 |
| 2006/0212748 A1 * | 9/2006 | Mochizuki et al. ............. | 714/6 |
| 2006/0218433 A1 * | 9/2006 | Williams ....................... | 714/6 |

FOREIGN PATENT DOCUMENTS

| | | |
|---|---|---|
| JP | 3-240123 | 10/1991 |
| JP | 07-200191 | 8/1995 |
| JP | 9-269871 | 10/1997 |
| JP | 10-40022 | 2/1998 |
| JP | 11-345095 | 12/1999 |
| JP | 2000-56935 | 2/2000 |
| JP | 2002-169660 | 6/2002 |

OTHER PUBLICATIONS

Notification of Reasons for Refusal issued Nov. 11, 2008 in corresponding Patent Application No. JP 2004-325 (7 pgs.).

* cited by examiner

*Primary Examiner*—Michael C Maskulinski
(74) *Attorney, Agent, or Firm*—Staas & Halsey LLP

(57) ABSTRACT

In case an error statistics of one of the disk drives exceeds a predetermined threshold, the disk is determined as a suspect disk drive. A recovery mode is set successively. During the time when a setting of the recovery mode is in progress and no access is made from a host 16 in this time, the address range of the suspect disk drive is specified. At the same time, a processing is started in that the data of the suspect disk is copied to a spare disk 34 sequentially to recover the data. The data of the suspect disk drive is copied to the spare disk drive 34 to recover the data when the address range of the suspect disk drive does not correspond to the write failure address range of a management table 48. The data of a normal disk drive is copied to the spare disk drive 34 to recover the data when the address range of the suspect disk drive corresponds to the write failure address range of the management table 48. Upon the completion of the recovery of the data, the suspect disk drive 32 is separated and replaced with the spare disk drive 34.

19 Claims, 24 Drawing Sheets

FIG. 4

| INDEX | WRITE FAILURE START SIGNAL | WRITE FAILURE END SIGNAL |
|---|---|---|
| 1 | LBA0100 | LBA0101 |
| 2 | LBA0301 | LBA0310 |
| 3 | LBA2011 | LBA2015 |
| 4 | LBA1172 | LBA1177 |
| 5 | LBA0644 | LBA0649 |
| | | |

| ADDRESS LBA | NORMAL DISK (60) | NORMAL DISK (62) | NORMAL DISK (64) | SUSPECT DISK (66) |
|---|---|---|---|---|
| 0 | P1 | D1 | D2 | D3 |
| 1 | D4 | P2 | D5 | D6 |
| 2 | D7 | D8 | P3 | D9 |
| 3 | D10 | D11 | D12 | P4 |
| 4 | P5 | D13 | D14 | D15 |
| 5 | D16 | P6 | D17 | D18 |
| 6 | D19 | D20 | P7 | D21 |
| 7 | D22 | D23 | D24 | P8 |

FIG. 8B  $P1_{OLD}$  $D1_{OLD}$  $D2_{OLD}$  $D3_{OLD}$

FIG. 8C  $D3_{OLD} = P1_{OLD} (+) D1_{OLD} (+) D2_{OLD}$

FIG. 8D  $D3_{NEW}$

FIG. 8E  $P1_{NEW} = P1_{OLD} (+) D3_{OLD} (+) D3_{NEW}$

FIG. 8F  $P1_{NEW}$  $D2$  $D2$  $D3_{NEW}$

| INDEX | WRITE START ADDRESS | WRITE END ADDRESS | WRITE PROCESSING TERMINATION STATUS | VALIDITY/INVALIDITY OF SUSPECT DISK DATA |
|---|---|---|---|---|
| 1 | LBA0250 | LBA0300 | NORMAL TERMINATION | INVALID |
| 2 | LBA1210 | LBA1250 | NORMAL TERMINATION | INVALID |
| 3 | LBA0040 | LBA0100 | ABNORMAL TERMINATION | VALID |
| 4 | LBA2100 | LBA2300 | NORMAL TERMINATION | INVALID |
| 5 | LBA01850 | LBA1900 | NORMAL TERMINATION | INVALID |

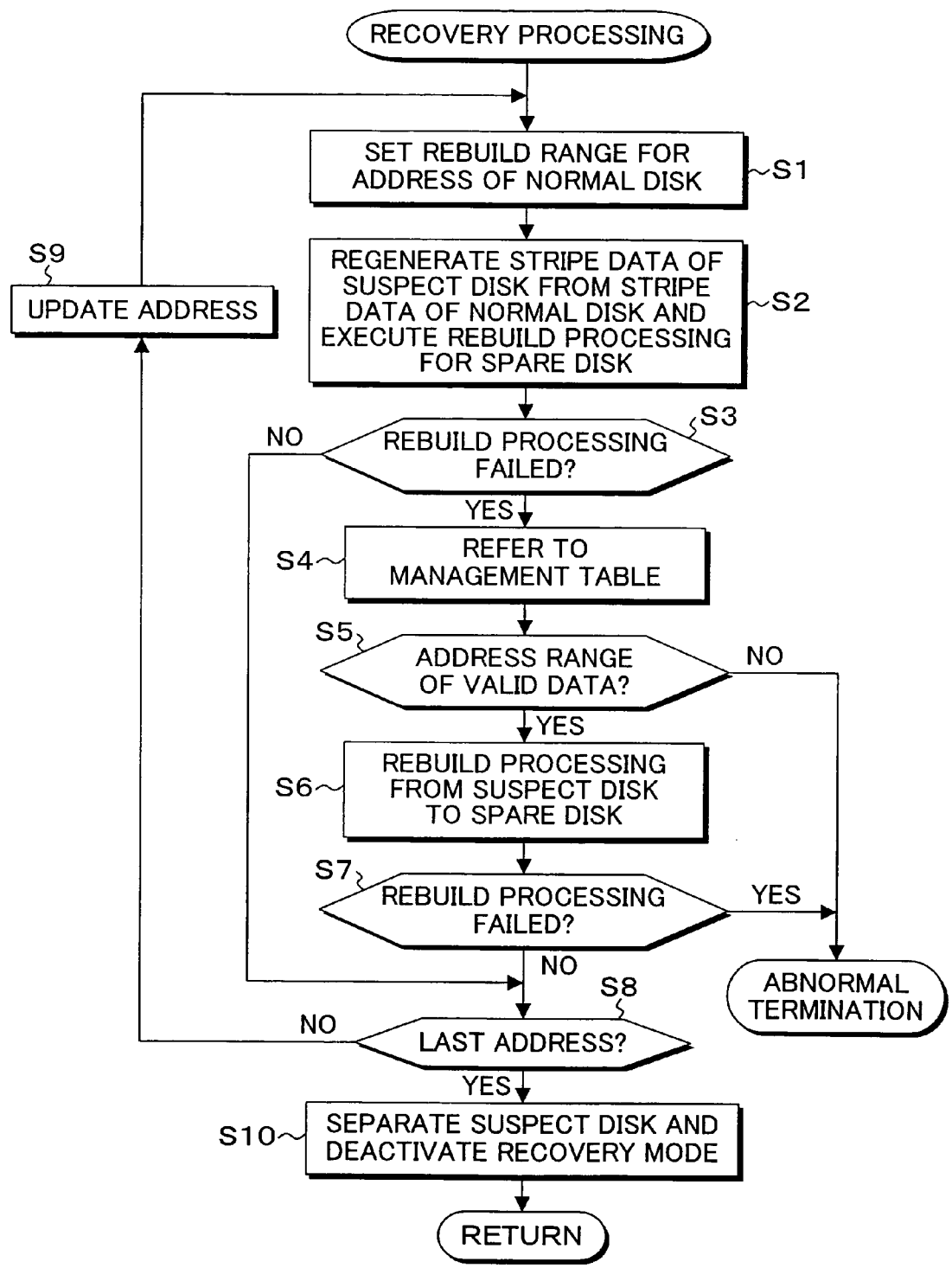

PROGRAM, STORAGE CONTROL METHOD, AND STORAGE SYSTEM

This application is a priority based on prior application No. JP 2004-325939, filed on Nov. 10, 2004, in Japan.

BACKGROUND OF THE INVENTION

1. Field of the Invention

The present invention relates to a program, a storage control method, and a storage system that read and write data to plural disk drives having a redundancy configuration based on commands from a host, more particularly, the invention relates to a program, a storage control method, and a storage system that recover data from a suspect disk drive whose addition value of error statistics reaching a threshold value to a spare disk drive doing hot standby and separate the suspect disk drive.

2. Description of the Related Art

In a disk array subsystem to process I/O requests from a host, a redundancy configuration known as RAID1 and RAID5 has been adopted up to now. In this configuration, I/O requests from a host are handled by the remaining normal disk drives in case some disk drives within the redundant configuration fail.

SUMMARY OF THE INVENTION

In the failures to occur in disk drives making up a disk array, one type of failure is a sudden failure caused by motor failures and the like. Another type of failure is the case in that factors such as partial failures gradually accumulate and develop into a failure. An addition value of error statistics is sought for a failure belonging to the latter case that occurs as a result of gradual accumulation of factors such as partial failures. A recovery processing of data to a spare disk drive ready and waiting known as hot standby is executed when an addition value of error statistics reaches a predetermined threshold value. Upon the completion of the data recovery, the failed disk drive is separated and the host is directly connected to the spare disk drive. Meanwhile, replacement and repair of the failed disk drive are carried out.

However, a problem of loss of redundancy existed in the data recovery processing executed from a failed disk to a spare disk in the conventional disk array subsystem described above. In the conventional data recovery processing, the separation of the failed disk drive is carried out even if the data recovery processing is not yet complete. Such a case occurs when an error is detected while the data recovery processing is in progress. Since this error occurred after an addition value of error statistics had exceeded a threshold value, redundancy no longer exists.

SUMMARY OF THE INVENTION

The present invention is to provide a program, a storage control method, and a storage system that improve the reliability by enabling the disk array subsystem to hold the redundancy configuration to the utmost extent without separating the failed disk while a failed status is detected during the data recovery processing. The invention provides a program executed on a computer having storage system (a disk array control unit 12) that reads and writes data to plural disk drives having a redundancy configuration based on a command from a host 16. The invention is characterized in that the data recovery to a spare disk 34 is mainly carried out through a copy processing from a suspect drive located under the same device adapter.

The program of the present invention is characterized by causing a computer to perform a program execution comprising: an error determining step that determines a suspect dusk drive when an addition value of error statistics of a disk drive included in any of a plurality of a disk array exceeds a predetermined threshold value and sets a recovery mode to recover the data to a spare disk drive located under the same device adapter with the suspect disk drive;

a read processing step that reads data from a normal disk drive excluding the suspect disk drive and responds in case a read command is received from a host while the setting of the recovery mode is in progress and reads data from the suspect disk drive and responds in case the read from the normal disk drive fails;

a write processing step that writes data into the normal disk drive, the suspect disk drive, and the spare disk drive in case a write command is received while the setting of the recovery mode is in progress and registers a write failure address range to the management table if the write failure is determined for the suspect disk drive;

a recovery processing step that specifies an address range of the suspect disk drive while a setting of the recovery mode is in progress and at the same time starts to copy the data in the suspect disk drive sequentially to the spare disk drive to recover the data and rebuilds the data in the normal disk drive located under a different device adapter to the spare disk drive to recover the data when the address range corresponds to the write failure address range of the management table or the recovery processing from the suspect disk drive to the spare disk drive fails and separates the suspect disk drive upon the completion of the recovery and replaces the suspect disk drive with the spare disk drive.

The storage system of the present invention has an RID1 redundancy configuration provided with a primary disk drive and a secondary disk drive that store the same data. The program of the present invention causes a computer to execute:

an error determining step that determines the primary disk drive or the secondary disk drive to be the suspect disk drive when the addition value of error statistics of the primary disk drive or the secondary disk drive exceeds a predetermined threshold value and sets the recovery mode to recover the data from the suspect disk drive to the spare disk drive located under the same device adapter with the suspect disk drive;

a read processing step that reads the data from the normal disk drive excluding the suspect disk drive and responds when a read command is received from the host while the setting of the recovery mode is in progress and reads the data from the suspect disk drive when the reading from the normal disk fails;

a write processing step that writes the data into the normal disk drive, the suspect disk drive, and the spare disk drive when a write command is received from the host while the setting of the recovery mode is in progress and the write processing step registers the write failure address range to the write management table when the write failure of the suspect disk is determined; and a recovery processing step that specifies the address range of the suspect disk drive during the time when no access is made from the host while the setting of the recovery mode is in progress and at the same time starts the processing to copy the data to the spare disk sequentially to recover the data and rebuilds the data to the spare disk drive from the normal disk drive located under a different device adapter to recover the data when the address range corresponds to the write failure address range of the management table or the recovery processing from the suspect disk drive into the spare disk drive fails, and the recovery processing step separates the suspect disk drive upon the completion of the recovery and replaces the suspect drive with the spare disk drive.

The storage system of the present invention has an RAID1 redundancy configuration provided with a plurality of disk drives that store a plurality of stripe data and the parity to the same address and causes to change the position of the disk that stores the parity at every address; the program of the present invention causes a computer to execute:

an error determining step that determines any of the disk drives as being the suspect disk drive when the addition value of error statistics of any of the disk drives exceeds the predetermined threshold value and sets the recovery mode to recover the data to the spare disk drive located under the same device adapter with the suspect disk drive;

a read processing step that calculates the read data of the suspect disk drive based on the data and the parity read from the normal disk and responds with the calculated data when a read command for the suspect disk drive is received from the host while the setting of the recovery mode is in progress nd reads from the suspect disk drive and responds with the read data in case the red from the normal disk fails;

a write processing step that recovers the old data of the suspect disk drive based on the old data and/or old parity read from the normal disks in case a write command for the suspect disk drive is received from the host, while the setting of the recovery mode is in progress; and a write processing step that additionally calculates a new parity based on the old data of the suspect disk drive, new data, and old data;

a write processing step that writes the new parity to the suspect disk drive and the spare disk drive as well as the normal disk that corresponds to the new parity; and the write ;processing step registers the write failure address to the management table in case the write failure of the suspect disk is determined; and a recovery processing step that specifies the address range of the suspect disk drive during the time when the setting of the recovery mode is in progress and no access is made from the host; at the same time, the recovery processing step starts the processing to copy the data to the spare disk sequentially to recover the data;

the recovery processing step calculates the data of the suspect disk drive based on data and parity read from the normal disk drives and rebuilds and recovers the data in case the address range corresponds to the write failure address range of the management table or the recovery processing from the suspect disk drive into the spare disk drive fails;

upon the completion of the recovery, the recovery processing step separates the suspect disk drive and replaces with the spare disk drive.

Another embodiment of the present invention is characterized in that data recovery into the spare disk drive is accomplished via rebuilding processing from the normal disk drive located under a different driver adapter. The present invention provides, as a second aspect of the invention, a program to be executed on a computer of a storage system which reads and writes data into and from the storage system having a redundant configuration on the basis of a command from the host.

The program according to further another embodiment of the present invention is characterized by making a computer program perform a program execution comprising:

An error determining step that determines the suspect disk drive when the addition value of error statistics of the disk included in the storage system of the redundancy configuration exceeds a predetermined threshold value and sets the recovery mode to recover the data to the suspect disk drive under the same device adapter with the suspect disk drive;

A write processing step that writes the data to the normal disk drives and the spare disk drive when a write command is received from the host while the setting of the recovery mode is in progress and additionally registers normal termination or abnormal termination of the normal disk drives and the validity or invalidity of the suspect disk drive to the management table in correspondence with the write address range;

A read processing step that reads the data from the normal disks excluding the suspect disk drive and responds with the data when a read command is received from the host during the time the setting of the recovery mode is in progress and confirms the address range of the suspect disk drive being within the valid address range from the management table and reads the data from the suspect disk drive and responds with the data; and A recovery processing step that specifies the address range of the normal disk drives located under a different device adapter sequentially when no access is made from the host during the time when setting of the recovery mode is in progress and at the same time starts the processing to rebuild the data to the spare disk to recover the data; the recovery processing step confirms the address range of the suspect disk drive being within the valid address range at the management table and copies the data of the suspect disk drive to the spare disk drive and recovers the data in case the rebuild recovery processing fails; the recovery processing separates the suspect disk drive and replaces the suspect disk drive with the spare disk drive.

The storage system has a redundancy configuration of RAID1 provided with the primary disk drive and the secondary disk drive storing the same data;

wherein the error determining step determines any of the primary disk drive and the secondary disk drive as being the suspect drive in case the addition value of error statistics of the primary disk or the secondary disk exceeds the predetermined threshold; and the error determining step sets the recovery mode to recover the data from the suspect disk drive to the spare disk drive located under the same device adapter;

wherein the write processing step writes the data to the normal disk drive and the spare disk drive when a write command is received from the host while the setting of the recovering mode is in progress and additionally registers normal termination or abnormal termination of the processing of the normal disk drives and the validity or invalidity if the data of the suspect disk drive to the management table to correspond with the write address range;

wherein the read processing step reads the data from the normal disk drives excluding the suspect disk drive in case a read command is received from the host during the time when the setting of the recovery mode is in progress; the read processing step reads the data from the suspect disk drive in case the read processing step fails in reading the data from the normal disk drive and responds with the data obtained from the suspect disk drive; the read processing step reads the data from the normal disks excluding the suspect disk drive and responds in case a read command is received from the host during the time the setting of the recovery mode is in progress; the read processing step confirms with the management table that the address range of the data of the suspect disk drive is within the valid address range and responds for the read command with the data from the suspect disk drive; and wherein the recovery processing step specifies the address range of the normal disk sequentially during the time when the setting of the recovery mode is in progress and when no access is made; the recovery processing step then starts the processing to rebuild the data to the spare disk and to recover the data;

the recovery processing step confirms that the address range of the data of the suspect disk is within the valid address range of the management table and copies the data in the suspect disk to the spare disk to recover the data in case the recovery processing fails, the recovery processing separates the suspect disk drive and replaces the suspect disk drive with the spare disk drive.

Furthermore, the storage system has an RAID1 redundancy configuration provided with a plurality of disk drives that store a plurality of stripe data and the parity and that cause the location of the disk storing the parity data to change at every stripe position;

wherein the error determining step determines one of the disk drives as being the suspect disk drive when the addition value of error statistics of one of the disk drives exceeds the predetermined threshold value and sets the recovery mode to recover the data to the spare disk drive located under the same device adapter with the suspect disk drive;

the write processing step recovers the old data of the suspect disk drive or old parity based on the old data and/or old parity read from the normal disk drives in case a write command for the suspect disk drive is received from the host while the setting of the recovery mode is in progress, and additionally calculates a new parity based on the new data recovered from the suspect disk drive and the old parity, writing the new data and parity into the normal disk drive and the spare disk drive, and additionally in correspondence with the write address range check whether the processing of the normal disk drives ended with normal termination or ended with abnormal termination and registers the result to the management table; also the write processing registers validity or invalidity of the suspect disk drive to the management table;

wherein the read processing step calculates the read data of the suspect disk drive based on the data and the parity read from the normal disk and responds with the calculated data when a read command for the suspect disk drive is received from the host while the setting of the recovery mode is in progress; and confirms that the address range of the suspect disk drive is valid in case the read from the normal disk drives fails and reads the data from the suspect disk drive after the confirmation and responds with the read data;

wherein the recovery processing step specifies the address range of the normal disk drives sequentially when no access is made from the host during the time when setting of the recovery mode is in progress and at the same time starts the recovery processing in that the recovery processing step calculates the read data of the suspect disk drive based on the read data and parity obtained from the normal disks to rebuild the data to the spare disk drive and to recover the data; the recovery processing step confirms the address range of the suspect disk drive being within the valid address range at the management table and copies the data of the suspect disk drive to the spare disk drive recovering the data in case the rebuild recovering processing fails, upon the completion of the recovery processing, the recovery processing step separates the suspect disk drive and replaces the suspect disk drive with the spare disk drive.

The present invention provides a storage control method that reads and writes data from and into a storage system having a redundancy configuration on the basis of a command from a host, comprising:

an error determining step that sets a recovery mode for receiving the data to a spare disk drive located under the same device adapter by determining a disk drive as being the suspect disk drive when an addition value of error statistics of a disk drive included in the disk array of the redundancy configurtion exceeds a predetermined threshold value;

a read processing step that reads data from the normal disk drive excluding the suspect disk drive and responds in case a read command is received from a host while the setting of the recovery mode is in progress and reads data from the suspect disk drive and responds in case the read from the normal disk drive fails;

a write processing step that writes data into the normal disk drive, the suspect disk drive, and the spare disk drive in case a write command is received while the setting of the recovery mode is in progress and registers a write failure address range to the management table if the write failure is determined for the suspect disk drive;

a recovery processing step that specifies an address range of the suspect disk drive while a setting of the recovery mode is in progress and at the same time starts to copy the data in the suspect disk drive sequentially to the spare disk drive to recover the data and rebuild the data in the normal disk drive located under a different device adapter to the spare disk drive to recover the data when the address range corresponds to the write failure address range of the management table or the recovery processing from the suspect disk drive to the spare disk drive fails and separates the suspect disk drive upon the completion of the recovery and replaces the suspect disk drive with the spare disk drive. (7)

The present invention provides another embodiment of the storage control method that reads and writes data from and into a storage system having a redundancy configuration on the basis of a command from a host, comprising:

an error determining step that sets a recovery mode for recovering the data to a spare disk drive located under the same device adapter by determining a disk drive included in the storage system of the redundancy configuration as being a suspect disk drive when an addition value of error statistics of said disk drive exceeds a predetermined threshold value;

a write processing step that, when a write command is received from the host during setting of said recovery mode, writes data into said normal disk drive and the spare disk drive, and registers a normal termination or an abnormal termination of the write processing of said normal disk drive in correspondence with the write address range and registers validity of invalidity of the data of said suspect disk drive into the management table;

a read processing step that, when a read command is received from the host during setting of said recovery mode, reads and responds the data from normal disk drives other than the suspect disk drive, and when read from said normal disk drive fails, confirms that the address is within a valid address range from said management table to read and respond the data of said suspect disk drive; and a recovery processing step that, when no access is made from the host during setting of said recovery mode, starts processing of rebuilding and recovering data to the spare disk drive while sequentially specifying address ranges of said normal disk drives located under a different device adapter, and when said rebuilding-recovering processing fails, confirms that the address is within a valid address range of said management table, recovers the data of said suspect disk drive by copying the same into said spare disk drive, and upon the completion of the recovery, recovers the data of said suspect disk drive by copying the same into said spare disk drive, separates said suspect disk drive and replaces the same with a spare disk drive. (7)

(Apparatus)

The present invention provides a storage system, that reads and writes data from and into a disk array of a redundancy configuration on the basis of a command from a host; comprising:

an error determining unit that sets a recovery mode for recovering data into a spare disk drive located under the same device adapter by determining a disk drive as being the suspect disk drive when the addition value of error statistics of a disk drive included in the disk array of the redundancy configuration exceeds a predetermined threshold value;

a read processing unit that, when a read command is received from the host during setting of said recovery mode, reads for response the data from a normal disk drive other than the suspect disk drive, and when read of said normal disk drive fails, reads the data from said suspect disk drive for response;

a write processing unit that, when a write command is received from the host during setting of said recovery mode, writes the data into said normal disk drive, the suspect disk drive and said spare disk drive, and when write into said suspect disk drive is determined to be a failure, registers the write failure address range in the management table; and a recovery processing unit that, when no access is made from the host during setting of said recovery mode, starts a processing of recovering by sequentially copying the data into the spare disk drive while specifying an address range of said suspect disk drive, and when said address range falls under the write failure address range of said management table or when a recovery processing from said suspect disk drive into the spare disk drive fails, rebuilds and recovers the data of said normal disk drive into said spare disk drive, and upon the completion of recovery, separates said suspect disk drive, and switches over the same into the spare disk drive. (9)

A storage system provided with a plurality of storage units and a control unit controlling the I/O of data to the storage system, comprising a read processing unit that reads data from the other plurality of storage units when an error is generated in one storage and a read command is received and reads data from the other storage units in case the data read fails from one storage unit.

The present invention provides a storage system having a plurality of storage units and a control unit that controls the input and output of data, comprising:

an error determining unit that sets the recovery mode to recover the data to the spare storage unit in case an error occurs in one of the plurality of storage units;

a write processing unit that registers the write failure address range with management table when a write command is received during the time when the setting of the recovery mode is in progress and in case the data write failure to one of the storage units is determined;

a recovery processing unit that specifies the address range of one of the storage units and at the same time copies the data to the spare storage unit sequentially to recover the data and that recovers the data stored in one of the plurality of storage units to the spare storage unit when the address range corresponds to the write failure address of the management table or when the recovery processing from one of the storage units to the space storage unit fails.

The present invention provides another embodiment of the storage system. The storage system of another embodiment of the present invention reads and writes data based on commands from the host to the plurality of disk drives having a redundancy configuration, and comprises:

an error determining unit that determines one of the disk drives as being the suspect disk drive when the addition value of error statistics of one of the disk drives exceeds a predetermined threshold value and sets the recovery mode to recover the data to the spare dick drive located under the same device adapter with the suspect drive.

a write processing unit that writes the data to the normal disk drives and the spare disk drive when a write command is received from the host while the setting of the recovery mode is in progress and additionally, in correspondence with the write address range, registers normal termination or abnormal termination of the normal disk drives and the validity or invalidity of the data of the suspect disk drive to the management table;

a read processing unit that reads the data from the normal disks excluding the suspect disk drive and responds with the data in case a read command is received from the host during the time the setting of the recovery mode is in progress and confirms the address range of the suspect disk drive is within the valid address range from the management table and reads the data from the suspect disk drive and responds with the data in case the reading from the normal disk fails;

a recovery processing unit that specifies the address range of the normal disk drives located under a different device adapter sequentially when no access is made from the host during the time when setting of the recovery mode is in progress and at the same time starts the processing to rebuild the data to the spare disk drive to recover the data; the secondary processing step confirms that the address range of the suspect disk drive is within the valid address range at the management table and copies the data of the suspect disk drive to the spare disk drive to recover the data in case the rebuild recovery processing fails; upon the completion of the recovery, the recovery processing separates the suspect disk drive and replaces the suspect disk drive with the spare disk drive.

The present invention provides a storage system comprising a plurality of storage units and a control unit that controls input/output of data into and from the storage units. The storage system of the invention comprises:

an error determining unit that sets a recovery mode for recovering data into a spare storage unit when an error occurs in any of the plurality of storage units;

a write processing unit that, when a write command is received during setting of the recovery mode, registers a normal termination of a write processing, the validity of data of the storage unit having an error, or an abnormal termination of a write processing, or the validity of data of the storage unit having an error; and a recovery processing unit that, when executing a recovery processing to the spare storage unit while specifying an address range of a normal storage unit, and the recovery processing fails, recovers the data of the storage unit producing the error into the spare storage unit by confirming that the data within the failing address range is valid from the management table.

In addition, specific examples on RAID1 and RAID5 in the storage control method and the storage system of the invention is basically the same with the program of the invention.

According to the invention, even if read failure or write failure occurs to an I/O request from the host during the data recovery processing to the spare disk drive from the suspect disk drive whose addition value of error statistics exceeding a predetermined threshold value, the situation will be dealt with a redundancy processing that includes the suspect disk drive to create an environment in that the condition requiring the separation of the suspect disk is not easily generated. The redundancy will be kept to the utmost extent even while the data recovery is in progress to keep the time and area where the redundancy will be lost to the minimum. As a result, a substantial reduction of the risk of losing data can be realized.

In the recovery processing of the invention in that the suspect disk drive occupies a main role, basically the suspect disk becomes a copy source and data is recovered to the spare disk drive that is under the same disk adapter. In this embodiment, unless the read processing from the normal disk drive fails, the read request out of the I/O requests received from the host is not executed to the suspect disk drive to reduce the possibility of occurrences of failure.

The double write is executed to the disk drives in the redundant configuration containing the suspect disk drive and the spare disk for write request. However, the separation of the suspect disk drive or the error response to the host is not made even if an error occurs in the write processing in the suspect disk drive. Instead, the failed part in the suspect disk drive will be registered to the management table.

Data recovery processing recovers data to the spare disk drive under the same device adapter with the suspect disk drive, a copy source. In case the failed part in writing was recognized from the management table, the failed part is rebuilt to the suspect disk drive from the normal disk drive under a different device adapter to recover the data. In case the data recovery processing from the suspect disk drive to the spare disk is failed, the data is dealt with a rebuild processing from the normal disk drive to the spare disk drive to recover the data. The maintenance of the redundant processing in the data recovery processing will be, thus, realized.

According to a different embodiment of the present invention, the normal disk drive takes a main role in the data recovery processing. In this data recovery processing, basically, the normal disk drive becomes the copy source, and the data is rebuilt to the spare disk drive to recover the data. In this embodiment, unless the read processing from the normal disk drive fails, the read request out of the I/O requests received from the host is not executed to the suspect disk drive to reduce the possibility of occurrences of failure.

A write request is executed to the normal disk drive and the spare disk drive of the redundant configuration, and the suspect disk drive is excluded. At the time the write processing is checked for the way it terminated. In corresponding to the write address range of the management table, normal termination or an abnormal termination will be registered to the management table. The data in the suspect disk drive will also be checked on its validity (when the processing ended with an abnormal termination) or invalidity (when the processing ended with normal termination). The result will be registered to the management table.

In the data recovery processing, the normal disk under a different device adapter becomes the copy source, and the data is rebuilt to the spare disk drive to recover the data. In case the rebuild processing fails, the data of the suspect disk is checked with the management table. If the data of the suspect disk drive is confirmed for the validity of the data, the data is copied to the spare disk drive from the suspect disk drive. The maintenance of the redundant processing in the data recovery processing will be, thus, realized.

The above and other objects, features and advantages of the present invention will become more apparent from the following detailed description with reference to the drawings.

BRIEF DESCRIPTION OF THE DRAWINGS

FIG. 4 is an explanatory diagram of a management table provided in a central processing module of FIG. 2;

FIG. 8A to 8F are explanatory diagrams showing the data recovery of a suspect disk recovery at RAID5, a new parity computation and writing in the write processing;

FIG. 15 is an explanatory diagram of a management table provided in the central processing module of FIG. 7;

FIG. 24 is a flowchart of the data recovery processing shown in FIG. 21;

DETAILED DESCRIPTION OF THE PREFERRED EMBODIMENTS

Figure 1:
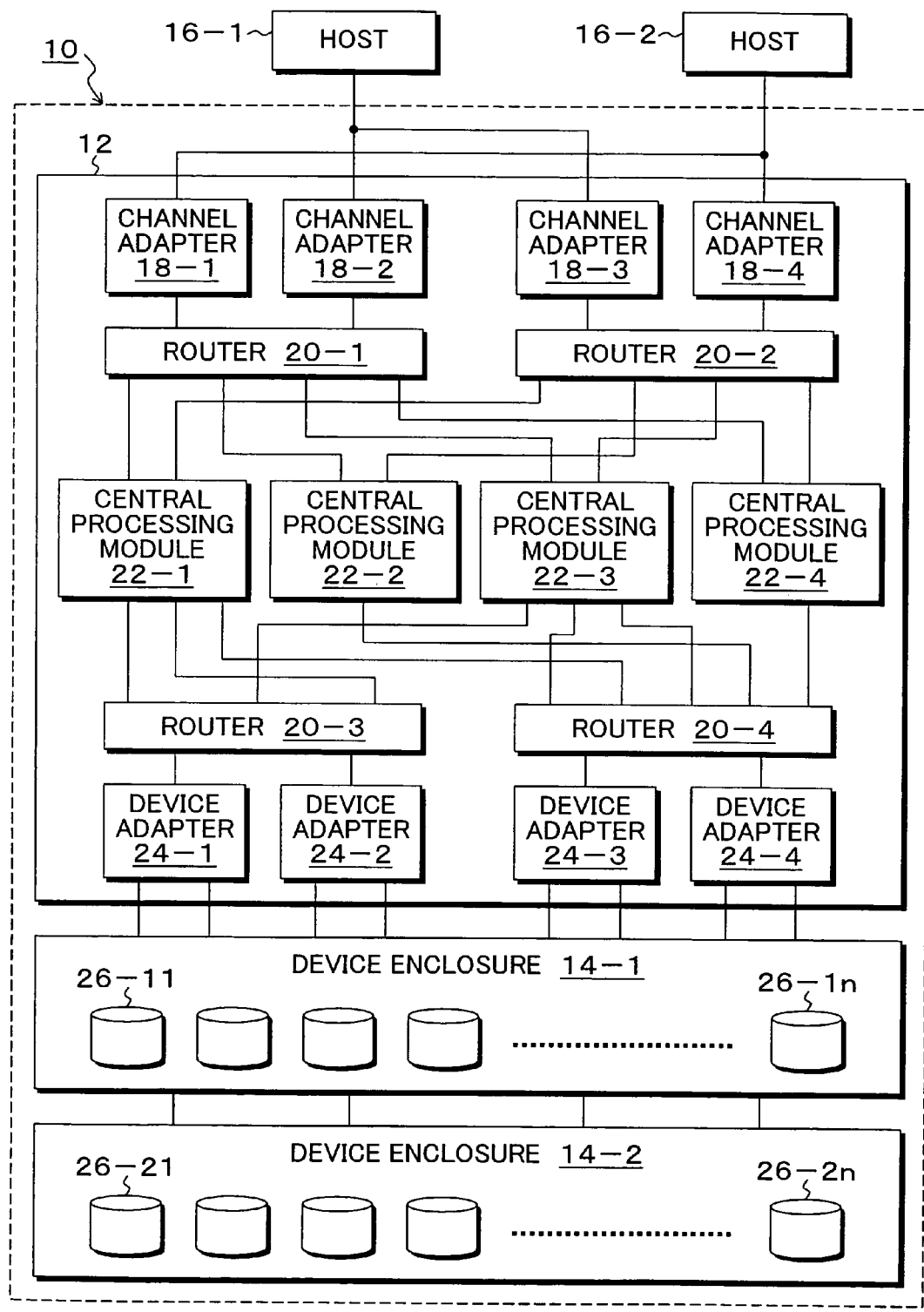
FIG. 1 is a block diagram of a disk array subsystem to which the invention is applied.
Figure 2:
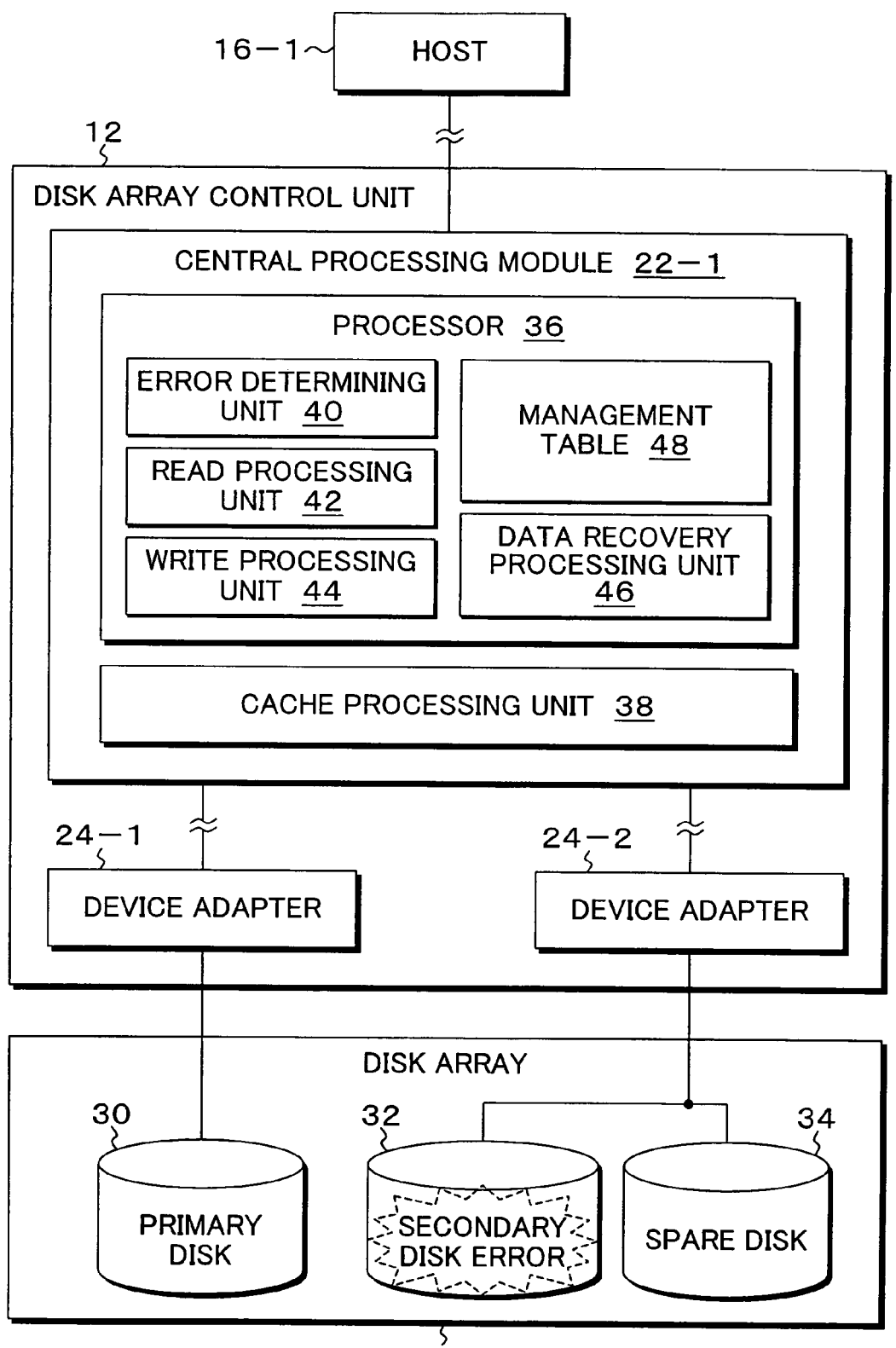
FIG. 2 is a block diagram of a first embodiment of a disk array control unit according to the invention for a redundancy configuration of RAID1.

FIG. 1 is a block diagram of a disk array subsystem having a redundancy configuration to which the invention is applied; the subsystem is a storage system. In FIG. 2, the disk array subsystem 10 is consisted of a disk array control unit 12 and device enclosures 14-1 and 14-2. To the disk array control unit 12 hosts 16-1 and 16-2 are connected as a host device.

In the disk array control unit 12 channel adapters 18-1 to 18-4, routers 20-1 and 20-2, central processing modules 22-1 to 22-4, routers 20-3 and 20-4, and device adapters 24-1 to 24-4 are provided. The device enclosures 14-1 and 14-2 are provided with disk drives 26-11 to 26-2n in this embodiment. Hard disk drives HDD are used for the disk drives 26-11 to 26-2n as physical and logical and devices (PLU). It is to be noted that the number of the channel adapter, the router and the device adapter in the disk array subsystem 10 can be increased as necessary.

Figure 3:
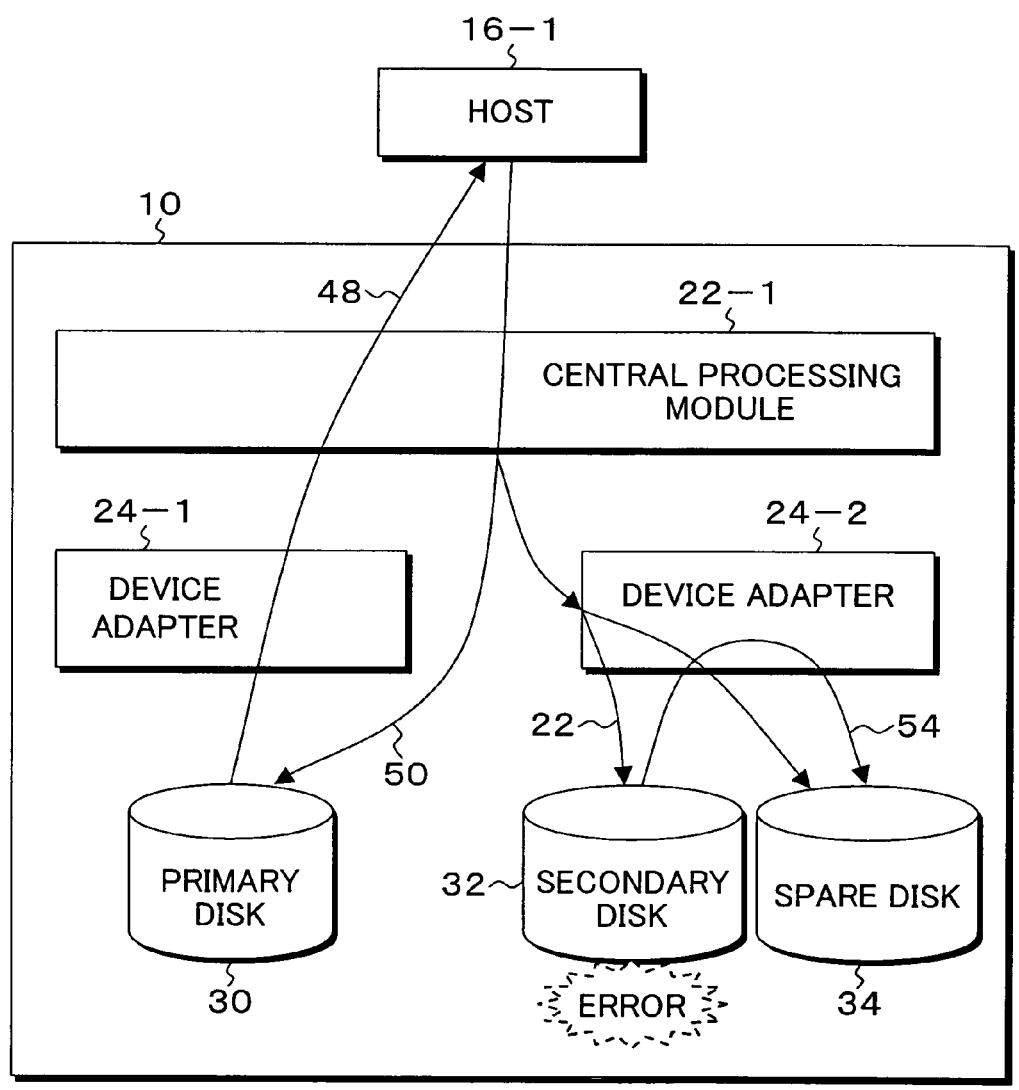
FIG. 3 is an explanatory diagram of a read processing, a write processing, and a data recovery processing in a recovery mode according to the disk array control unit of FIG. 2.

FIG. 2 is a block diagram of a first embodiment of the disk array control unit for RAID1 redundancy configuration according to the invention. The data recovery to a spare disk drive in a recovery mode is carried out from a suspect disk drive whose addition value of error statistics exceeded a predetermined threshold value. The suspect disk, thus, takes a main role in the data recovery. Making the suspect disk drive take a main role in data recovery is a characteristic of this embodiment. The disk array control unit in FIG. 3 is a view in that the system related to the central processing module 22-1 of FIG. 2 is brought out. The central processing module 22-1 is provided with a processor 36 and a cache processing 38. The processor 36 is connected to the host 16-1 through one of the channel adapters among the channel adapters 18-1 to 18-4 and through one of the routers 20-1 and 20-2 shown in FIG. 1. The processor 36 is connected to the device adapters 24-1 and 24-2 through one of the routers 20-3 and 20-4. To the device adapters 24-1 and 24-2, a disk array 28 is connected. Corresponding to RAID1 in the disk array 28, a primary disk 30 and a secondary disk 32 are provided. In addition, a spare disk 34 is provided as a hot standby.

The device adapters 24-1 and 24-2 are connected to at least one spare disk drive under the device adapters 24-1 and 24-2 in this embodiment. In the FIG. 3, as a way of an example, the data in the secondary disk 32 is recovered to the spare disk. The spare disk 34 is shown, therefore, under the device adapter 24-2. In the redundancy configuration of RAID1, a mirror configuration is adopted in that the same data are stored in the primary disk drive 30 and the secondary disk drive 32. To read request based on the I/O request from the host 16-1, by a way of example, the response is made from the predetermined primary disk 30. Meanwhile, to the write request, writing is made to both of the primary disk 30 and the secondary disk 32. To processor 36 provided to disk array control unit 12, an error determining unit, a read processing unit, a write processing unit, a data recovery processing unit, and a management table 48 are provided as functions to be implemented by the program control. The error determining unit 40 determines either the primary disk drive 30 or the secondary disk drive 32 as the suspect disk drive if the addition value of error statistics of one of the primary disk drive 30 and the secondary disk drive 32 exceeds the predetermined threshold. Upon determining the suspect disk drive, the error determining unit 40 sets the recovery mode to recover the data from the suspect disk drive to the spare disk drive 34 located under the same device adapter 24-2 with the suspect disk drive. In this example, the explanation will be presented using the case in that the addition value of error statistics of the secondary disk 32 exceeds the threshold value and the secondary disk drive 32 is determined as the suspect disk drive.

An addition value is set in advance for each type of error including a motor stop error, a medium defect error, a mode error and the like occurring during the operation of the disk array control unit 12. Each time an error occurs, the corresponding addition value is sought for the addition value of error statistics. When this addition value of error statistics exceeds the threshold value, the recovery mode is to be set. Upon receiving a read command from the host 16-1, while the setting for the recovery mode is in progress, the read processing unit 42 responds by reading from the normal disk drive excluding the suspect disk drive. In case the read fails from the normal disk drive, the read processing unit responds by reading from the suspect disk drive. The occurrence of error during the data recovery is avoided to the utmost extent by excluding the suspect disk drive from the read object as described above. Upon receiving a write command from the host 16-1 while the setting for the recovery mode is in progress, the write processing unit 44 writes into both of the normal disk drive and the suspect disk drive. Additionally, the write processing unit 44 executes the double writing in that the write processing unit writes into the suspect disk drive at the same time the write processing unit writes into the spare disk drive 34. When writing into the suspect disk drive fails, the write processing unit 44 neither executes the separation processing nor executes the error response for the write processing. The write processing 44, instead, registers the address range where the writing failed to the management table 48. In this registration, the write processing unit 44 registers the start address and the end address according to the logical block address LBA in the suspect disk drive. During the time when access from the host 16-1 is not made while the setting of the error recovery is in progress, the data recovery processing unit 46 specifies the address range of the suspect disk drive into the predetermined unit. At the same time, the data recovery processing unit 46 copies the data in the suspect disk drive sequentially into the spare disk 34 located under the same device adapter 24-2 with the suspect disk drive to recover the data. In this error recovery processing, the data recovery processing refers to the management table 48 of the suspect disk drive. When the address range to copy corresponds to the registered address range that failed in writing, the data recovery processing unit executes staging from the normal disk drive located under a different device adapter 24-1 to the central processing module 22-1. Upon the completion of the staging the data recovery processing unit 46 rebuilds the data into the spare disk drive to recover the data.

In case the address range to copy from the suspect disk drive does not correspond to the address range registered to the management table 48 for failure in writing, the data recovery processing recovers the data from the suspect disk drive. When this recovery from the suspect disk drive fails, the data recovery processing rebuilds the data from the normal disk drive to recover.

In this data recovery the suspect disk takes a main role. When this data recovery to the spare disk 34 is complete, the suspect disk drive is separated and replaced with the spare disk drive. After the separation the suspect disk drive will be under the care of a maintenance personnel who takes necessary measures such as change and repair.

FIG. 3 is a general explanatory diagram of read processing, write processing, and data recovery processing in recovery mode according to the disk array control unit of FIG. 2. FIG. 4 shows that the secondary disk drive is determined to be the suspect disk drive and a read processing 48 is carried out while the setting of the data recovery mode is in progress. In this situation, the read processing 48 is executed to the read request from the host 16-1; the read processing 48 only responds from the primary disk drive namely the normal disk drive. To the write request from the host 16-1, a write processing 50 is executed. The write processing 50 writes into the primary disk drive 30 namely the normal disk drive. At the same time, a double write 52 is executed. The write 52 writes into both of the secondary disk drive 32 to be the suspect drive and the spare disk drive 34 at the same time. In the idle state in that access from the host 16-1 is absent, a copy processing 54 is executed. In this processing, through the device adapter 24-2 data is copied from the secondary disk drive 32 namely the suspect disk drive to the spare disk drive 34 and the data is recovered.

FIG. 4 is an explanatory diagram of the management table 48 provided with the disk array control unit 12 of FIG. 2. The management table 48 has an index, a write failure start address, and a write failure end address; and registers the logical block address (LBA) and the end logical block address of the time a failure occurred in case the write processing to the suspect disk drive fails. The data recovery processing 46 refers to this management table 48 when the data recovery processing 46 copies data from the suspect disk drive to the spare disk drive to recover the data. In case the address range to copy corresponds to the write failure address range registered to the management table 48, the data recovery processing unit 46 does not recover the data from the suspect disk drive and carries out the data recovery from the normal disk drive.

Figure 5:
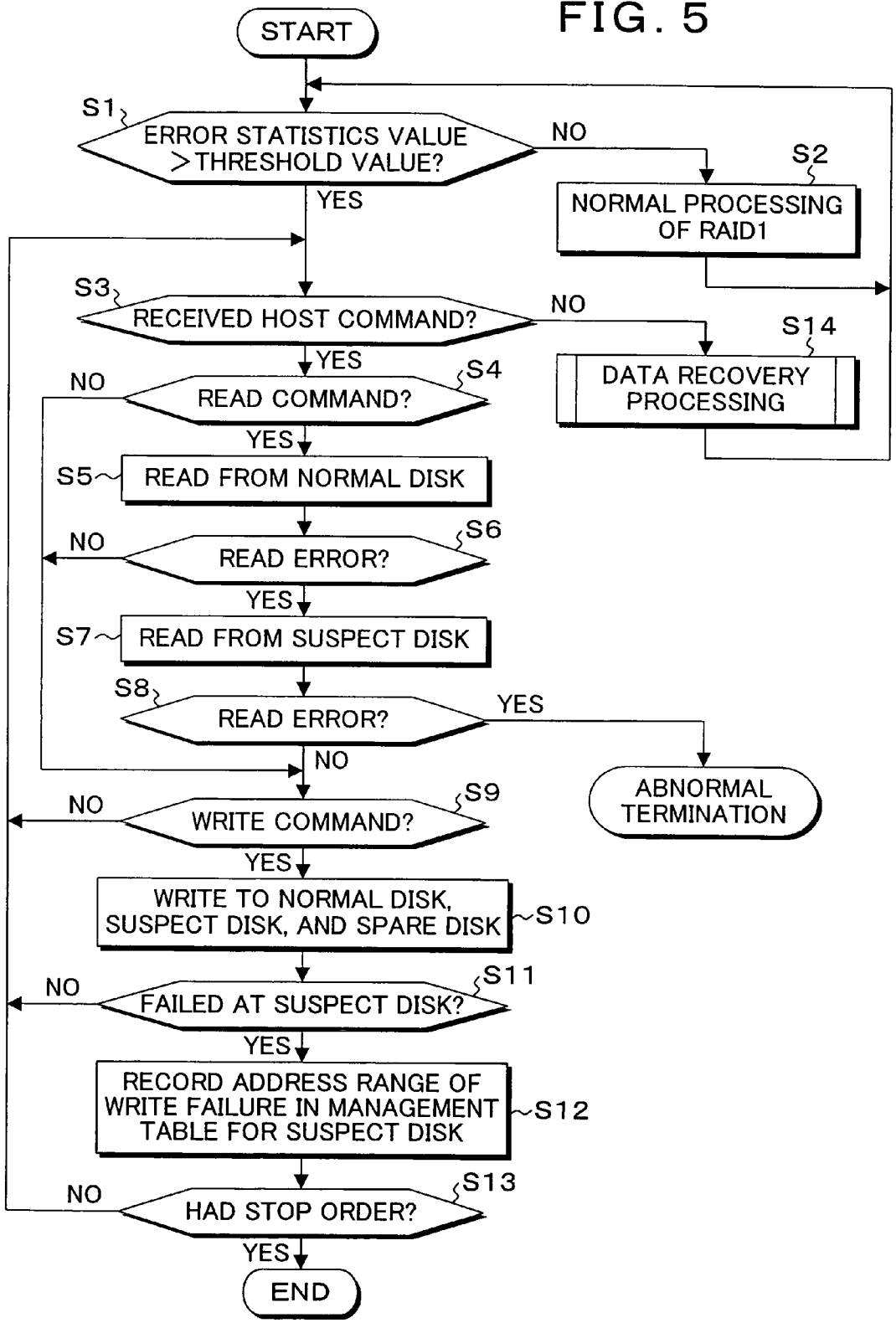
FIG. 5 is a flowchart of the disk array control processing of FIG. 2.

FIG. 5 is a flowchart of the disk array control processing of FIG. 2. FIG. 5 shows that in Step S1 each of the primary disk drive 30 and the secondary disk drive 32 in the redundancy configuration of RAID 1 is checked whether the addition value of error statistics exceeded the predetermined threshold value or not. If the addition value of error statistics of each of the primary disk drive 30 and the secondary disk drive 32 does not exceed the predetermined threshold value, the regular processing of RAID1 is carried out at Step S2. Step S1 shows a case in that the threshold value of one of the primary disk drive 30 and the secondary disk drive 32 exceeds the addition value of error statistics. The example deals with the case in that the threshold value of the secondary disk 32 drive exceeded the threshold value. Accordingly, the recovery mode to the spare disk drive 34 located under the same device adapter with the secondary disk drive 32 is set. Upon the completion of the setting of the recovery mode, the processing is moved to step S3 and the reception of the command from the host is checked. In the idle state in that no host command is received, the processing is moved to step 14 and the data recovery processing is carried out. The data recovery processing is the processing to copy the data in the secondary disk drive 32 to the spare disk drive 34 to recover the data. The secondary disk drive is the suspect disk drive. When the host command is received during the time the setting of the recovery mode is in progress at Step 3, the processing is moved to step 4. If the command is a read command, the data is read from the primary disk 30 at step S5 and the response is made. The primary disk 30 is the normal disk drive. When a read error is determined at step S6 for the read from the normal disk drive, read is made from the secondary disk drive 32 at step 7 and the response is made. The secondary disk drive 32 is the suspect disk drive. When a read error is determined in step S8 for the read from this suspect disk drive, it is made to be an abnormal termination. Meanwhile, in case the host command is determined to be a write command at step S9, the processing is moved to step 10. At step 10 the write is made into the normal disk drive and the suspect disk drive. The normal disk drive is the primary disk drive 30; the suspect drive is the secondary disk drive 32. Additionally the write is also made into the spare disk 34. The processing neither executes the separation of the secondary disk drive 32 nor executes the error response for the write processing in case it is determined that writing into the secondary disk drive 32 is failed at step 11. The secondary disk drive 32 is the suspect disk drive. At step 12, the processing, instead, registers the start address and the end address as the write failure address range to the management table 48 for the suspect disk drive shown in FIG. 4. Presence of a stop order is checked at step S13 successively. Processing from step S3 is repeated until the stop order is issued. When the recovery processing to the spare disk drive is complete in the data recovery processing at step S14, the recovery mode is deactivated; and the processing is returned to the regular processing of step S1 and step S2.

Figure 6:
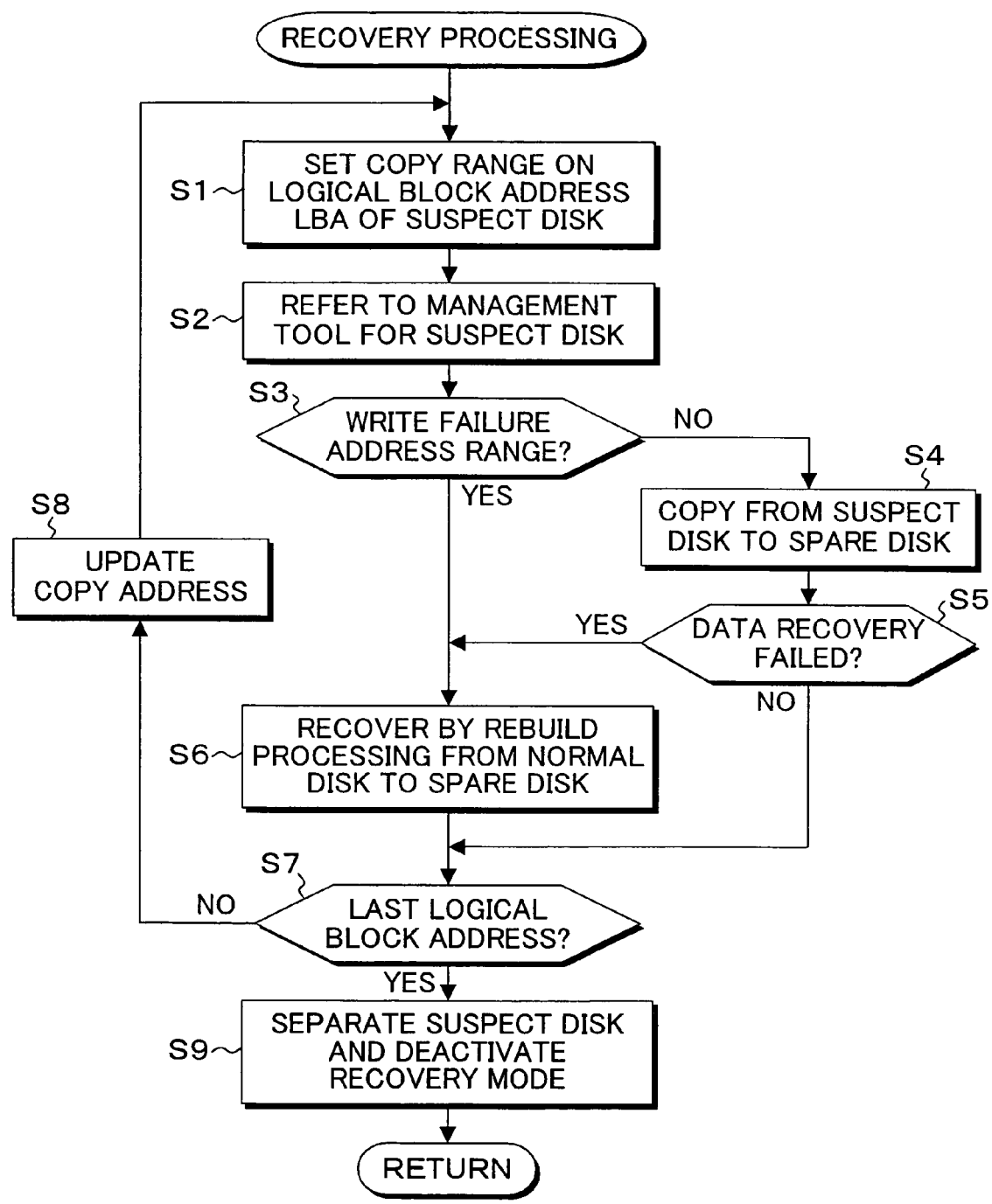
FIG. 6 is a flowchart of a data recovery processing shown in FIG. 5.

FIG. 6 is a flowchart of the data recovery processing of step 14 shown in FIG. 6. In FIG. 6, the first copy range on the logical block address LBA of the suspect disk drive to be the copy source is set at step S1. The management table for the suspect disk drive is referred to in step S2. In step S3, the address range of the suspect disk is checked whether the address range set is the write failure address range or not. If the address range set is not the write failure address range, the processing is moved to step S4. The data in the address range set is copied to the spare disk 34 from the suspect disk drive. If the data recovery processing did not fail at step S5, the processing is moved to step S7. In step S7 the address range set is checked whether the address range set is the last logical block address or not. If the address range set is not the last logical block address, the copy address is updated at step 8. Afterward, the processing is returned to the step S1 and the processing is repeated.

In case the address range set in step S3 corresponds to the write failure address range of the management 48 for the suspect disk drive, the processing is moved to step S6. The data in the address range is rebuilt from the normal disk drive into the spare disk drive to recover the data. When the copy address range reaches the last logical block address in step S7, the processing is moved to step S9. At this step, the suspect disk drive is separated and the recovery mode is deactivated. By this separation of the suspect disk drive and the deactivation of the recovery mode, the processing is returned to the regular processing in the redundancy configuration of RAID1 and the suspect disk drive is replaced with the spare disk drive completed with the data recovery.

Figure 7:
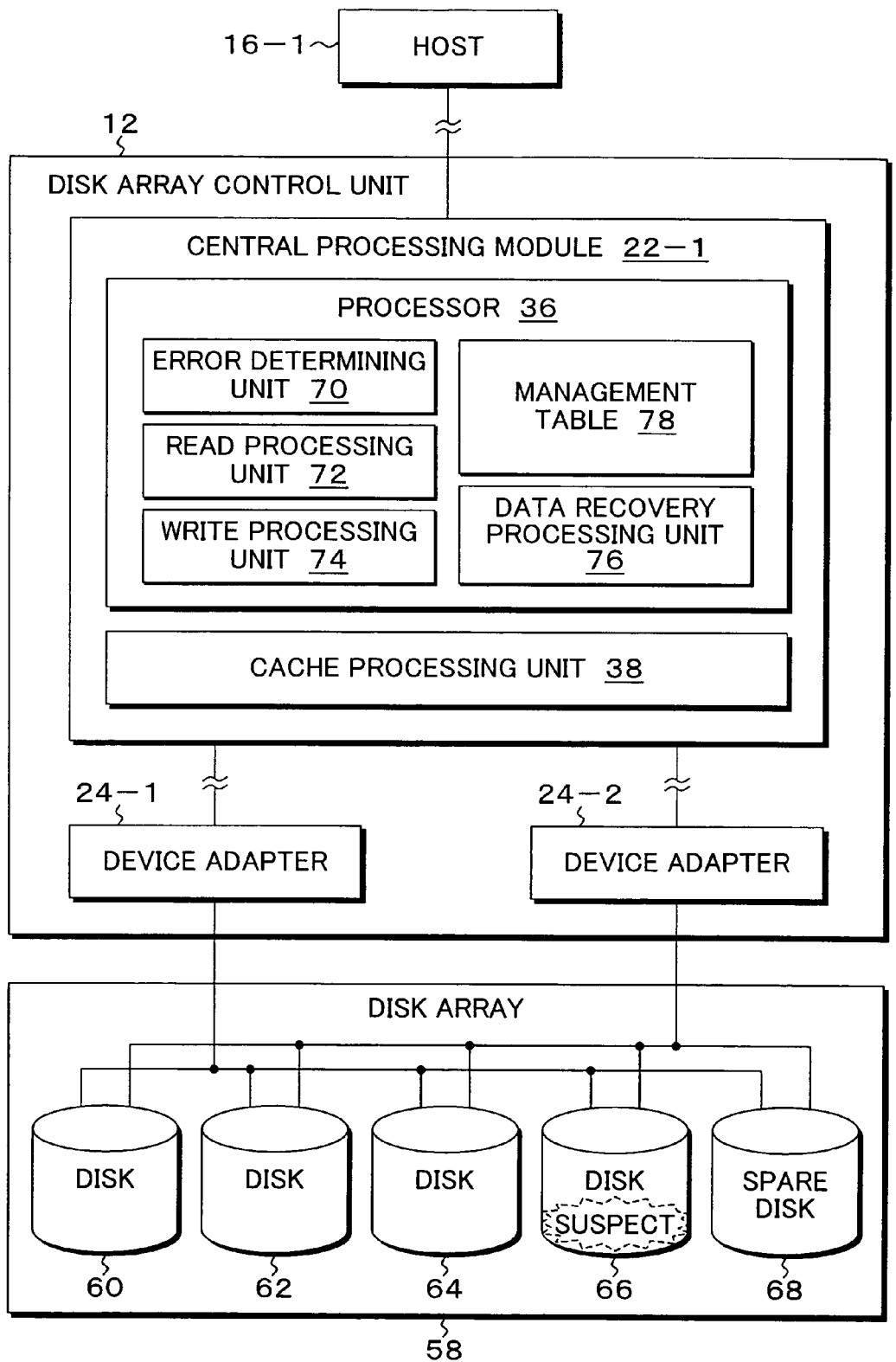
FIG. 7 is a block diagram of a second embodiment of the disk array control unit according to the invention for the redundancy configuration of RAID2.

FIG. 7 is a block diagram of a second embodiment of the disk array control unit according to the invention. This second embodiment is for a redundancy configuration of RAID5. In the same way as the first embodiment shown in FIG. 3, the data is recovered to the spare disk drive from the suspect drive during the time when the setting of the recovery is in progress. In this embodiment, the suspect disk drive takes a main role. Making the suspect disk drive take a main role in data recovery is a characteristic of this embodiment.

In FIG. 7, for the disk array control unit 12, a central processing module 22-1 is shown as a representation of the system. The central module 22-1 is provided with a processor 36 and the cache processing unit 38. To the processor 36, the host 16-1 is connected and I/O requests from the host 16-1 are carried out. A disk array 58 is also connected to the processor 36 via the device adapters 24-1 and 24-2.

The disk array 58 takes the redundancy configuration of RAID5. Four disk drives of disk drives 60, 62, 64, and 66 compose the redundancy configuration of RAID5. A spare disk drive 68 is also provided as a hot standby. The split data commonly called stripe data is stored to the three disk drives out of the four disk drives 60, 62, 64, and 66. A parity sought from the three strip data is stored in the remaining disk drive. The position of the disk drive storing the parity changes per every address of the stripe date to the three disk drives.

FIG. 8A shows an example of the storage situation of the four disk drives 60, 62, 64, and 66 having the redundancy configuration of RAID5. The second embodiment shown in FIG. 7 is an example in that among the four disk drives the disk drive 66 is determined as the suspect disk drive because the addition value of error statistics of the disk drive 66 exceeded the threshold value. In FIG. 8A, therefore, the disk drives 60, 62, and 64 are shown as normal disk drives; and the disk drive 66 is shown as the suspect disk drive.

As is apparent from FIG. 8A, the stripe data and parity are stored in the logical block address LBA of the disk drives 60, 62, 64, and 66. The logical block address LBA start at 0 and continues as 1, 2 3, . . . . Of these, the parity is stored in the different position at every address. In accessing the group of disk drives in the redundant configuration of RAID5, read or write can be done using the stripe data of each disk drive unit as a smallest unit.

In referring to FIG. 7 again, the processor 36 of the disk array control unit 12 is provided with an error determining unit 70, a read processing unit 72, a write processing unit 74, a data recovery processing unit 76 and a management table 78. In case one of the disk drives 60, 62, 64, and 66 making up the redundancy configuration of RAID5 exceeds the predetermined threshold, the error determining unit 70 makes a decision as a suspect disk drive for the disk drive whose addition value of error statistics exceeded the threshold. After making the decision, the error determining unit 70 sets the recovery mode to recover the data from the suspect disk drive to the spare disk drive 68 located under the same device adapter 24-2 with the suspect disk drive. In explaining this embodiment, an example is used in that the addition value of error statistics of the disk 66 exceeds the threshold and is determined as the suspect disk drive. In case the read processing 72 receives a read command from the host 16-1 while the setting of the recovery mode is in progress, and in case the read object includes the data from the disk drive 66 that is being the suspect disk drive, the read processing unit 72 calculates the data of the disk drive 66 based on the data and/or parity read from the disk drives 60, 62, and 64 in accordance with the RAID5 redundancy system. The disk drives 60, 62, and 64 are the normal disk drives. Upon the completion of the calculation, read processing 72 responds with the data.

By way of example, a read request for the disk drive 68 whose logical bloc address LBA in FIG. 8A is 0 and who is the suspect disk drive will be considered. In this example, the read processing unit 72 reads the data P1, D1, and D2 of the disk drives 60, 62, 64 as shown in FIG. 8B. In case the read processing unit 72 reads the data already in the disk drives as shown in FIG. 8A, this data is called old data. In the same way, parity already in the disk drives is called old parity. The word "OLD" is attached at the back of each code of the old data and parity in the subscript format. As for the data to write for the first time, this data is called new data or new parity. In expressing new data, the word "NEW" is attached at the back of each code of new data.

(Old parity $P1_{OLD}$), (Old data $D1_{OLD}$), (Old data $D2_{OLD}$) are a rendition of what is explained above. The data "$D3_{OLD}$" in the suspect disk 66 is enclosed by the box made with a dashed line and the data is not read out. The old data $D3_{OLD}$ is calculated based on the data read out from the normal disk drives 60, 62, and 64 shown in FIG. 8B, according to the RAID redundancy system as shown in FIG. 8C. In different words, the old data $D3_{OLD}$ is calculated by taking Exclusive-OR shown in the sum of the three old data of old parity $P1_{OLD}$, old data $D1_{OLD}$, and $D2_{OLD}$ read out from the three normal disk drives 60, 62, and 64 shown in the plus sign (+) in FIG. 8C. In the read processing while the setting of the recovery mode is in progress as shown in FIG. 7, reading out from the suspect disk drive is not executed when a read request for the stripe date in the suspect disk drive is received. Since the disk drive 66 is the suspect drive, the read request for the stripe date in the disk drive 66 is not executed. The requested data is sought by calculating based on the data read out from different normal disk drives 60, 62, and 64. It is to avoid the occurrences of error accompanied by the read processing from the disk drive 66 that is a disk drive determined as the suspect disk drive. Upon receiving a write command from the host 16-1 while the setting of the recovery mode is in progress, and the write object includes the data contained in the disk drive 66 who is the suspect disk drive, the write processing unit 74 provided to the processor 36 calculates the data of the disk drive 66, in the same way as the read processing 72 does. Namely, the write processing 74 calculates the data of the disk drive 66 based on the data read out from the disk drives 60, 62, and 64 who are the normal disks as shown in FIGS. 8B, 8C.

FIG. 8D shows a new data $D3_{NEW}$. This new data is the write request to the suspect disk 66. The write processing unit 74, thus, calculates a new parity using the method of calculation shown in FIG. 8E. The calculation method is as follows: New parity=old parity(+)old data(+) new data, $P1_{NEW}=P1_{OLD}(+)D3_{OLD}(+)D3_{NEW}$.

The write processing unit 74 writes the new parity P1new to the corresponding disk drive 60 and writes the new data to the suspect disk drive 66 as shown in FIG. 8F. In addition, the failed address range is registered to the management table if it was determined that the writing failed when the new data was written to the suspect disk drive. This management table 78 is basically the same as the management table 48 shown of the first embodiment shown in FIG. 4. To this management table an index, a write failure start address and a write failure end address are registered. A data recovery processing unit 76 provided to the processor 36 specifies the address range of the disk drive 66 that is the suspect disk drive while the setting of the recovery mode is in progress and no access from the host 16-1 is recognized. At the At the same time, the recovery processing unit 76 copies the data to the spare disk drive 68 sequentially to recover the data. The data recovery processing unit 76 checks whether the copy address range of the suspect disk drive 66, namely the copy source, corresponds to the write failure address range of the management table 78 or not. If the copy address range of the suspect disk drive 66 does not correspond to the write failure address range of the management table 78, the data recovery processing unit recovers the data from the suspect disk drive 66. If the copy address range of the suspect address corresponds to the write failure address range of the management table 78, the data recovery processing unit 76 calculates the data based on the data and parity read from the disk drives 60, 62, and 64. The disk drives 60, 62, and 64 are normal disks. Upon completion of the calculation, the data recovery processing unit 76 rebuilds the data to the spare disk 68 to recover the data.

Figure 9:
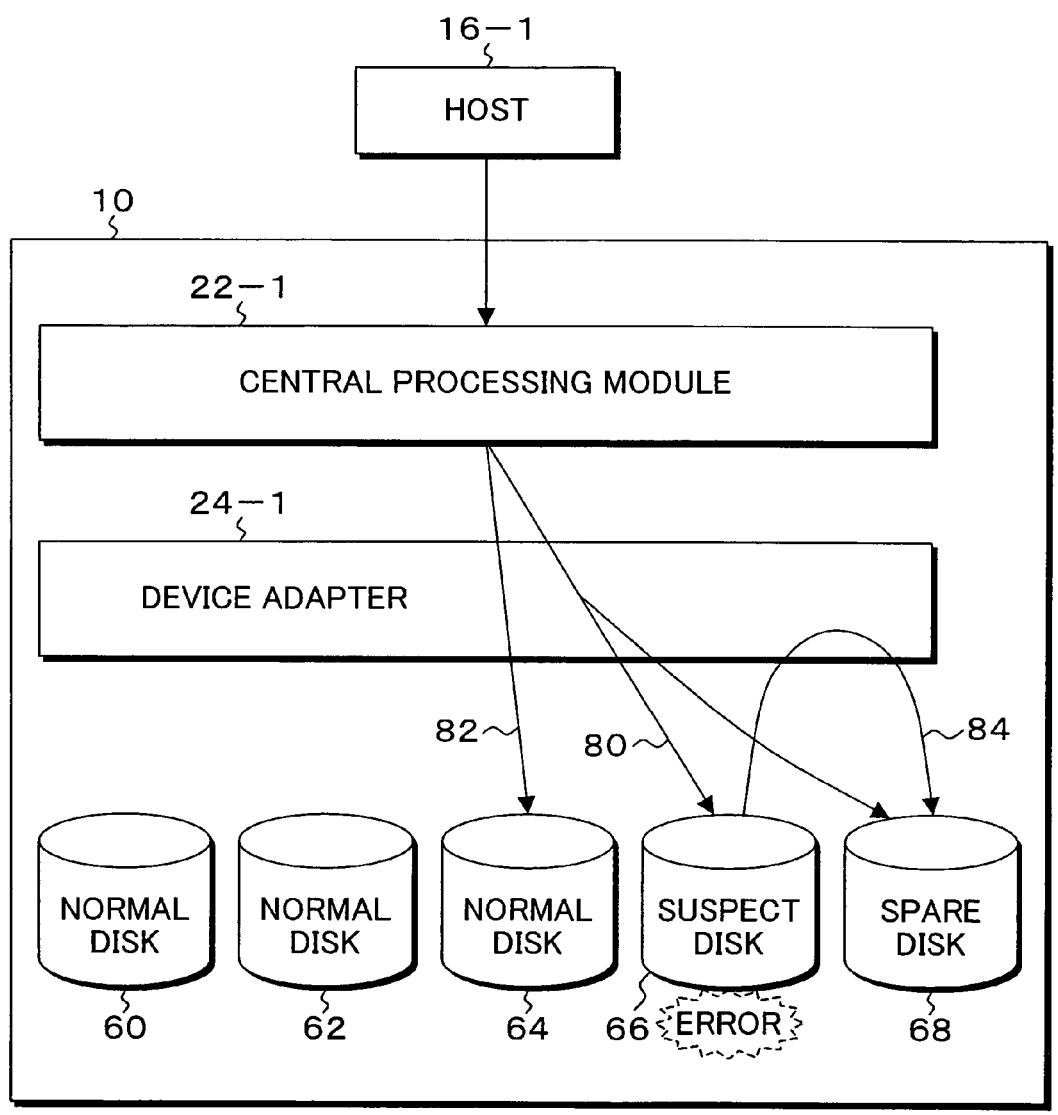
FIG. 9 is an explanatory diagram of the read processing, the write processing, and the data recovery processing in the recovery mode according to a disk array control unit of FIG. 7.

FIG. 9 shows an overview of the read processing, write processing, and data recovery processing in the recovery mode according to the disk array control unit for the redundancy configuration of RAID5 of FIG. 7. First, the read response from the suspect disk drive 66 will not be carried out in case a read request is received from the host 16-1 to the suspect disk drive 66. The data from the normal disk drives 60, 62, and 64 will be read. Then logical-OR will be calculated based on the data and/or parity read out from the normal disk drives 60, 62, and 64 to seek the data of the suspect disk drive 66. The data of the suspect disk drive 66 that is obtained by above calculation will be responded to the host 16-1. When a write request is made from the host 16-1 to the suspect disk drive 66, in the same as the case of the read request, an exclusive-OR will be sought from the read out data of the normal disk drives 60, 62, and 64. The data of the suspect disk drive will be calculated using the exclusive-OR. A new parity is calculated based on a new data from the host 16-1, the old data of the suspect disk drive obtained by the calculation, and the old parity obtained from one of the normal disk drives 60, 62, and 64. The new data is stored in the suspect drive 66 by a data write processing 80. As a way of example, a parity write processing 82 will be executed for a new parity to the normal disk drive 64 that stores parity. In the data recovery processing to the spare disk drive 68 from the suspect disk drive 66 while the setting of the recovery mode is in progress, if the copy address range of the suspect disk drive 66 does not corresponds to the write failure address range of the management table 78, a data copy processing copies the data to the spare disk drive; and a copy processing 84 stores the data to the spare disk drive 68. The data of the suspect disk drive 66 is calculated by using the exclusive-OR based on the data read out from the normal disk drives 60, 62, and 64 in case the copy address range of the suspect disk drive corresponds to the write failure address range registered to the management table 78. The calculated data of the suspect disk drive 66 is rebuilt to the spare disk drive 68 to recover the data.

Figure 10:
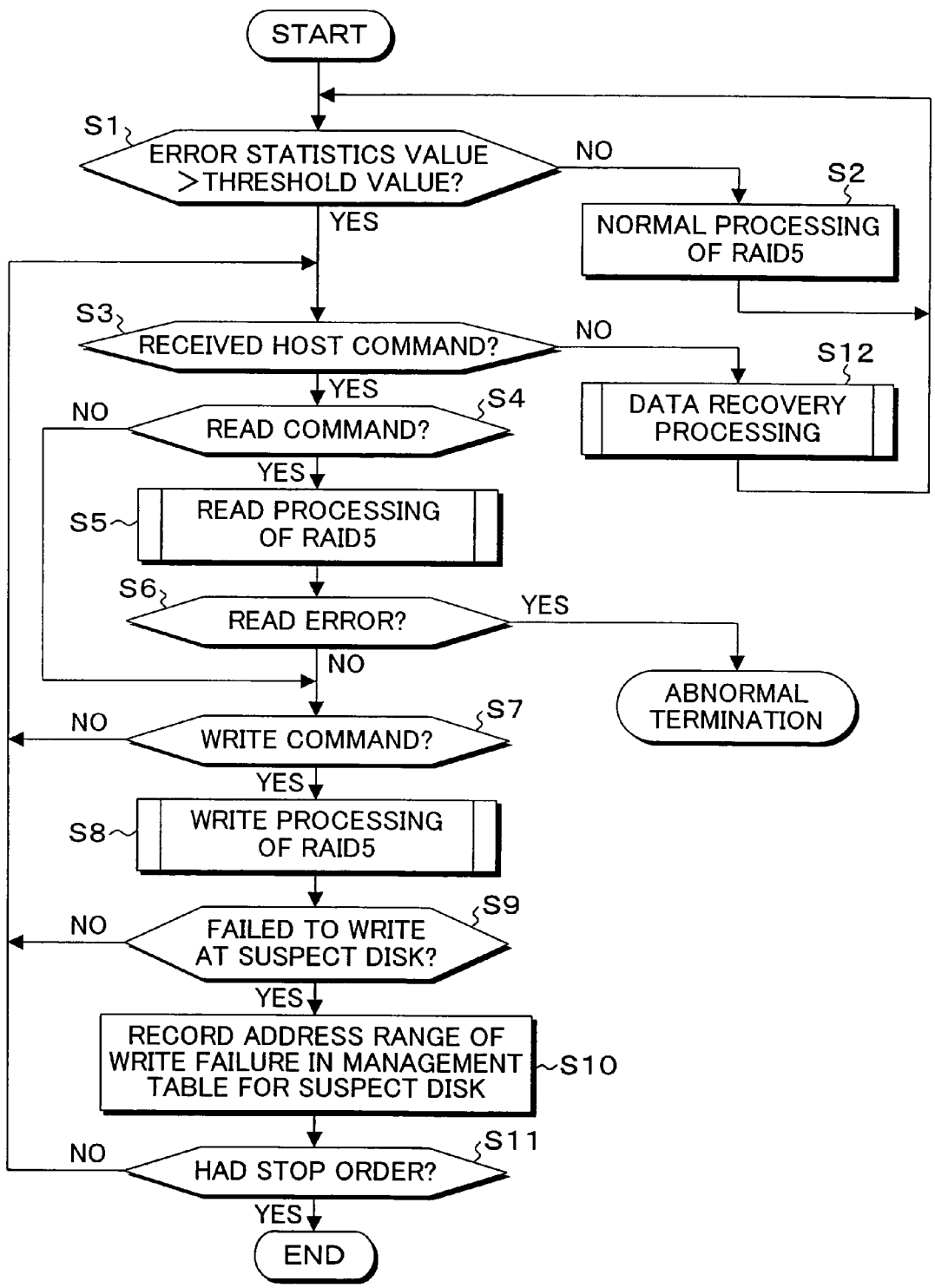
FIG. 10 is a flowchart of the disk array control processing of FIG. 8.

FIG. 10 is a flowchart of the disk array control processing of FIG. 7. FIG. 10 shows that in Step S1 each of the four normal disk drives 60, 62, 64, and 64 in the redundancy configuration of RAID 5 is checked whether the addition value of error statistics exceeded the predetermined threshold or not. The regular processing of RAID5 is carried out at Step S2 until one of the disk drives exceeds the addition value of error statistics. The processing is moved to the step S3 by setting the recovery mode when the addition value of error statistics of one of the disk drives exceeds the threshold value. At step S3, the presence of reception of the host command is checked. At stet S12, the data recovery processing is executed in the idle state in that no command is received from the host. At step S5, the RAID5 read processing is executed when the host command is received at step S3 and the host command is determined to be a read command. At step S6, the presence of a read error is checked. The processing ends with an abnormal termination if the presence of a read error is determined. The processing is moved to step S8 when the host command is determined to be a write command and the RAID5 write processing is executed at step S8. The processing is moved to step S10 when the write failure into the suspect disk drive is determined at step S9. The write failure and the address range are registered at the management table 78 for the suspect disk drive. The processing from step S3 will be repeated until the stop order is issued at step S11. The RAID5 read processing at Step S5, the RAID5 write processing at step S8, and the data recovery processing at step S12 will be presented more in detail in the flowcharts of FIG. 11, FIG. 12, and FIG. 13.

Figure 11:
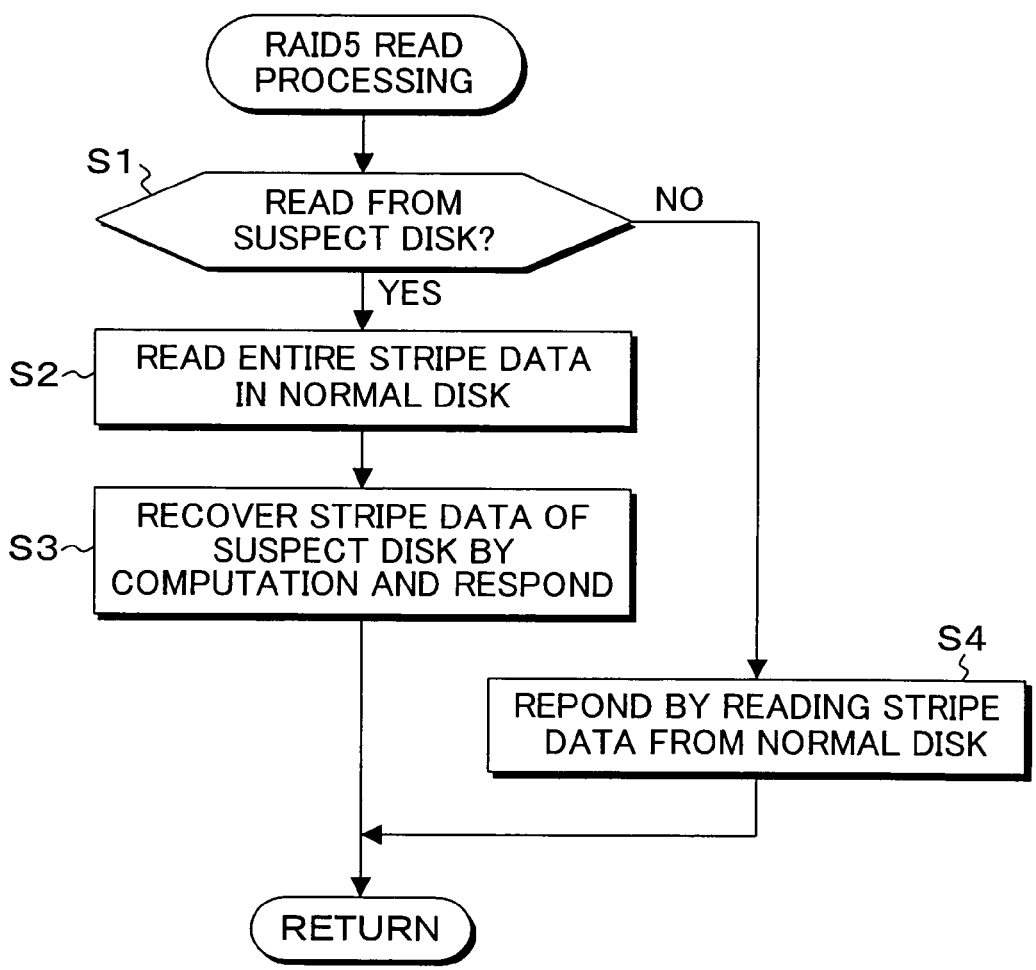
FIG. 11 is a flowchart of the RAAID5 read processing shown in FIG. 10.

FIG. 11 is a flowchart of RAID5 read processing at step S5 shown in FIG. 10. In FIG. 11, the read request is checked whether the read request is for the suspect disk drive or not. The processing is moved to the step S2 if the target of the read request is the suspect disk drive. At step S2, all the stripe data from the normal disks (including parity) are read. At step S3, the data of the suspect disk is calculated by taking the exclusive-OR of all data and the data is recovered; the response is made with the recovered data. The processing is moved to step S4 if the read request received at step S1 is not aimed at the suspect disk drive. At step S4 the stripe data of the normal disks are responded. As described above, the read processing from the suspect disk drive is not executed in the RAID5 read processing while the setting of the recovery response is in progress. The data of the suspect disk drive is calculated from the read data of the normal disk drives to recover the data and to respond with the data. The occurrence of error resulted from reading the data from the suspect disk drive is, thus, avoided.

Figure 12:
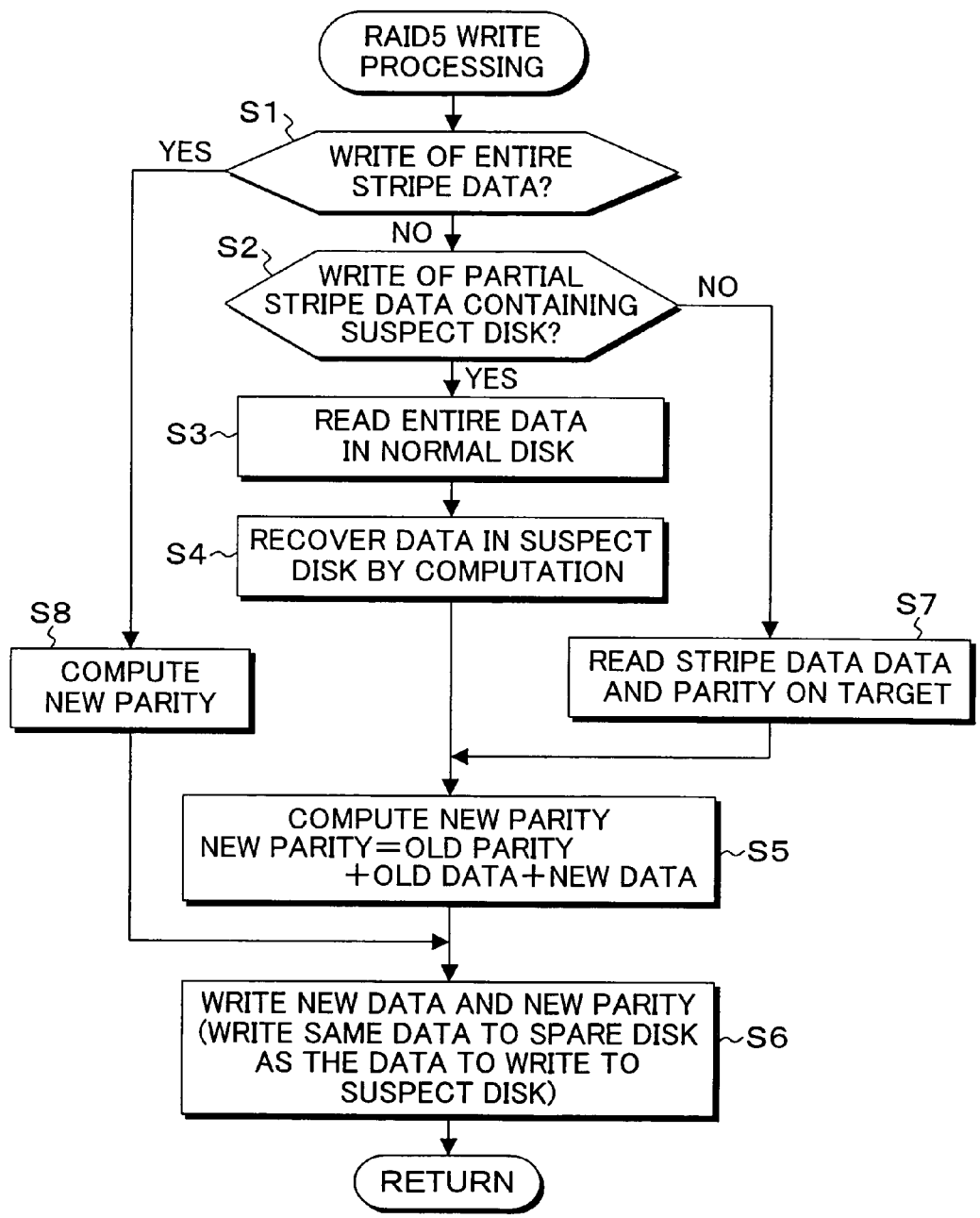
FIG. 12 is a flowchart of the RAID5 write processing shown in FIG. 10.

FIG. 12 is a flowchart of RAID5 write processing at step S8 shown in FIG. 10. In FIG. 12, the write request executed in step 1 is checked whether the request is for the entire stripe data of the requested address. The processing is moved to step S2 if the write request is aimed at the partial stripe data. At step S2, the write request is checked whether the request is the partial stripe data containing the suspect disk drive or not.

The processing is moved to step S3 if the write request includes the data in the suspect disk drive. At step S3, the entire data of the normal disk drives are read. An exclusive-OR of the entire data of the normal disks is sought at step S4 to calculate the data of the suspect disk drive and to recover the data. Successively, at step S5 exclusive-OR of the old parity, old data, and the new data is sought to calculate a new parity. The new data is written into the suspect disk drive at step S6. At the same time, the new parity is written into the normal disk drive in which the new parity is to be released. At step S2, from each of the normal disk drives the strip data and the parity are read respectively if the write command of the partial strip data does not include the data in the suspect disk drive. The new parity is calculated at step S5. The new data and new parity will be written to the corresponding normal disk respectively. The processing is moved to step S8 if it was determined that the write request was for the entire stripe data in step S1. At step S8, the new parity is calculated from the exclusive-Or of the new data. At step S6, the new data and the new parity are written to the corresponding disk drive.

Figure 13:
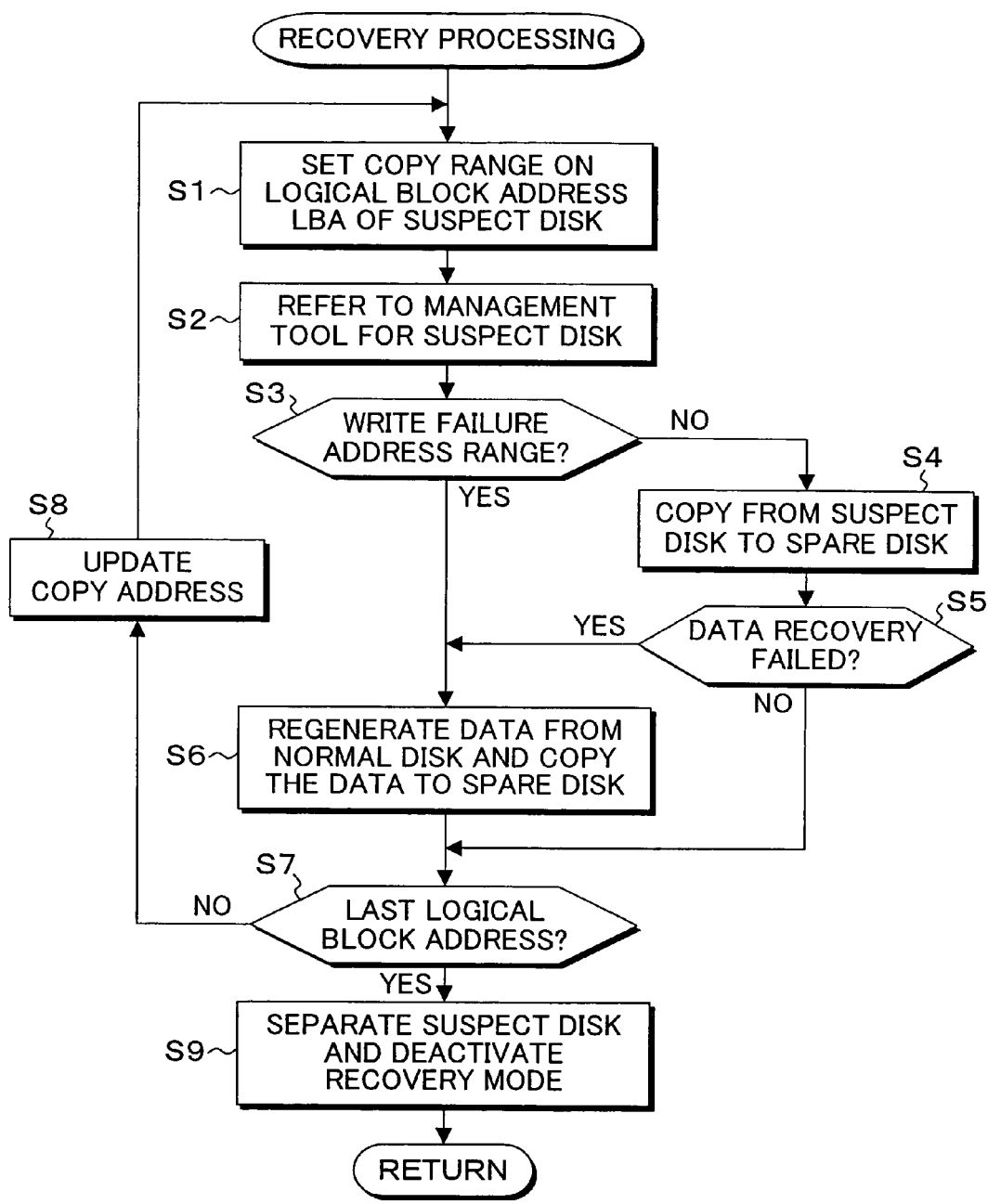
FIG. 13 is a flowchart of the data recovery processing shown in FIG. 10.

FIG. 13 is a flowchart of the data recovery processing of step 12 shown in FIG. 10. FIG. 13 shows that the first copy range for the logical block address LBA of the suspect disk drive is set at step S1. At step S2, the management table 78 for the suspect disk drive is referred. At step S4, the data in the suspect disk drive is copied to the spare disk drive to recover the data if the first copy range is determined to be not in the write failure address range at step S3. The presence of the data recovery failure is checked at step S5 successively. The processing is moved to step S7 if the data recovery processing did not fail. In step S7 it is checked that the address range set is whether the last logical block address or not. If the address range set is not the last logical block address, the copy address is updated at step S8. Afterward, the processing is returned to the step S1 and the processing is repeated. The processing is moved to step S6 in case the copy address range corresponds to the write failure address range of the management table 78 at step S3. The data is read from the normal disks at step S6. The data in the suspect disk drive is calculated using the exclusive-OR. After this regeneration, the data is copied to the spare disk drive 68 to recover the data.

The suspect disk drive is separated at step S9 when it is determined that the copy address reached the last logical block address and the suspect disk drive is replaced with the spare disk drive having completed the data recovery. The recovery mode is deactivated and the processing is returned to the RAID5 regular processing.

Figure 14:
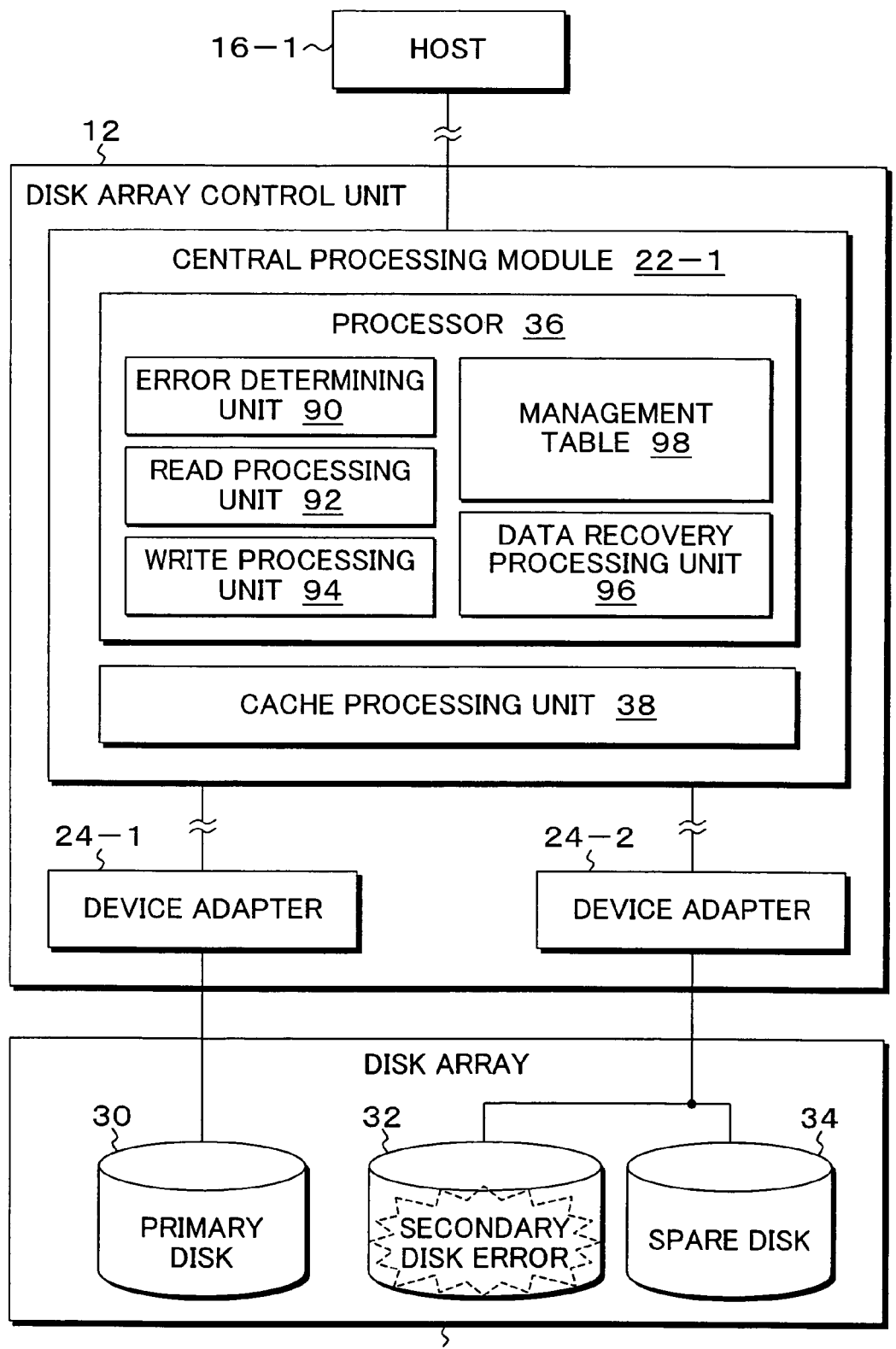
FIG. 14 is a block diagram of a third embodiment of the disk array control unit according to the invention for the redundancy configuration of RAID1.

FIG. 14 is a block diagram of a third embodiment of the disk array control unit according to the invention. This third embodiment is for the RAID1 redundancy configuration. In this embodiment, the data is rebuilt into the spare disk drive from the normal disk drive located under a different device adapter to recover the data. The use of the rebuild processing through the normal disk drive under a different device adapter in the data recovery processing is a characteristic of this embodiment. In FIG. 14, the central processing module 22-1 in the disk array control unit 12 is provided with the processor 36, the cache processing unit 38. The disk array 28 is connected via the device adapters 24-1 and 24-2. The disk array 28 is provided with the primary disk drive 30 and the secondary disk drive 32 making up the redundancy configuration of RAID1. The spare disk drive 34 as a hot standby is also provided to the disk array 28. As a way of example, a case will be examined in that the secondary disk is determined as the suspect disk drive because the addition value of error statistics exceeded the threshold value and is determined to be the suspect disk drive. The processor 36 is provided with an error determining unit 90, a read processing unit 92, a write processing unit 94, a data recovery processing unit 96 and a management table 98. The error determining unit 90 monitors the addition value of error statistics of the primary disk drive and the secondary disk drive making up the redundancy configuration of RAID1. When the addition value of error statistics of one of the disks exceeds the predetermined threshold, the error determining unit 90 makes a decision toward the disk drive whose addition value of error statistics exceeded the threshold as the suspect disk drive. After making the decision, the error determining unit 90 sets the recovery mode to recover the data from the suspect disk drive to the spare disk drive 34 located under the same device adapter 24-2 with the suspect disk drive. Upon receiving a read command from the host 16-1, while the setting for the recovery mode is in progress, the read processing unit 92 responds by reading from the primary disk drive 30, that is the normal disk drive, excluding the secondary disk drive 32 as the suspect disk drive. In case the read processing from the primary disk drive 30, namely the normal disk drive, fails, the read processing unit 92 confirms that the data of the secondary disk drive is within the valid address range in the management table 98 of which will be explained later. After the confirmation, the read processing unit 92 reads the data from the secondary disk drive 32. The secondary disk drive is the suspect disk drive. The write processing 94 writes into the primary disk drive 30 and the spare disk 34 in case a write command is received while the setting of the recovery mode is in progress. The primary disk drive and the spare disk drive are the normal disk drives. The write processing 94, thus excludes the secondary disk drive 32 from reading. The secondary disk drive is the suspect disk drive. The write processing unit 92 registers for the write processing to the management table 98 whether the write processing ended with normal termination or ended with an abnormal termination in correspondence with the write address range of the management table 98. The validity or invalidity of the data in the secondary disk drive 32 will be also registered. The secondary disk drive 32 is the suspect drive.

At this time if the write processing ends with normal termination, the data in the secondary disk drive 32 is invalid because the normal termination indicates that the data is not updated. The secondary disk drive 32 is the suspect disk drive. Meanwhile, if the write processing ends with an abnormal termination, the data in the secondary disk drive 32, that is the suspect disk drive, is valid.

FIG. 15 is an explanatory diagram of the management table 98 of FIG. 14. The management table 98 is consisted of the index, the write start address, the write end address, a write processing end state (normal termination or an abnormal termination), and a validity/invalidity of the suspect disk data. The write start address and the write end address specify the address range of a write start. For the write processing end state in the management table 98, the execution of write will be registered as normal termination. Non-execution of write will be registered as an abnormal termination. As for the validity/invalidity of the suspect disk data, if the write processing ends with normal termination, the data in the suspect disk drive is not updated; the write processing will be registered to be invalid. Meanwhile, if the write processing ends with an abnormal termination, the data in the normal disk drive is not updated; the data in the suspect disk drive will be registered as valid. In the specific example in the management table 98 in FIG. 15, for the write processing end state, if the processing ends with normal termination, flag pit is set to 1. If the processing ends with an abnormal termination, flag pit is set to 0. For the validity/invalidity of the suspect disk data, flag pit 1 is set for the valid data. Flag pit 0 is set for the invalid data.

In referring to FIG. 14 again, a data recovery processing unit 96 specifies the address range of the primary disk drive 30 sequentially when no access is made from the host 16-1 while the setting of the recovery mode is in progress. The primary disk drive is the normal disk. While specifying the address range sequentially, the recovery processing unit 96 rebuilds the data into the spare disk drive 34 to recover the data. The rebuild processing is to do the staging of the data of the primary disk drive 30 located under the different device adapter 24-1 on the cache memory provided to the cache processing 38 of the processor 36 and then to write the data to the spare disk 34. When the rebuild processing to the spare disk drive 34 for data recovery fails, and in case the failed address range is included in the valid address range of the management table 98 by which the data of the secondary disk drive 32, namely the suspect disk drive, becomes valid, the data recovery processing unit 96 copies the data of the secondary disk drive 32 to the spare disk drive 34 to recover the data. In this way, secondary disk drive 32, namely the suspect disk drive, executes the redundancy processing.

Figure 16:
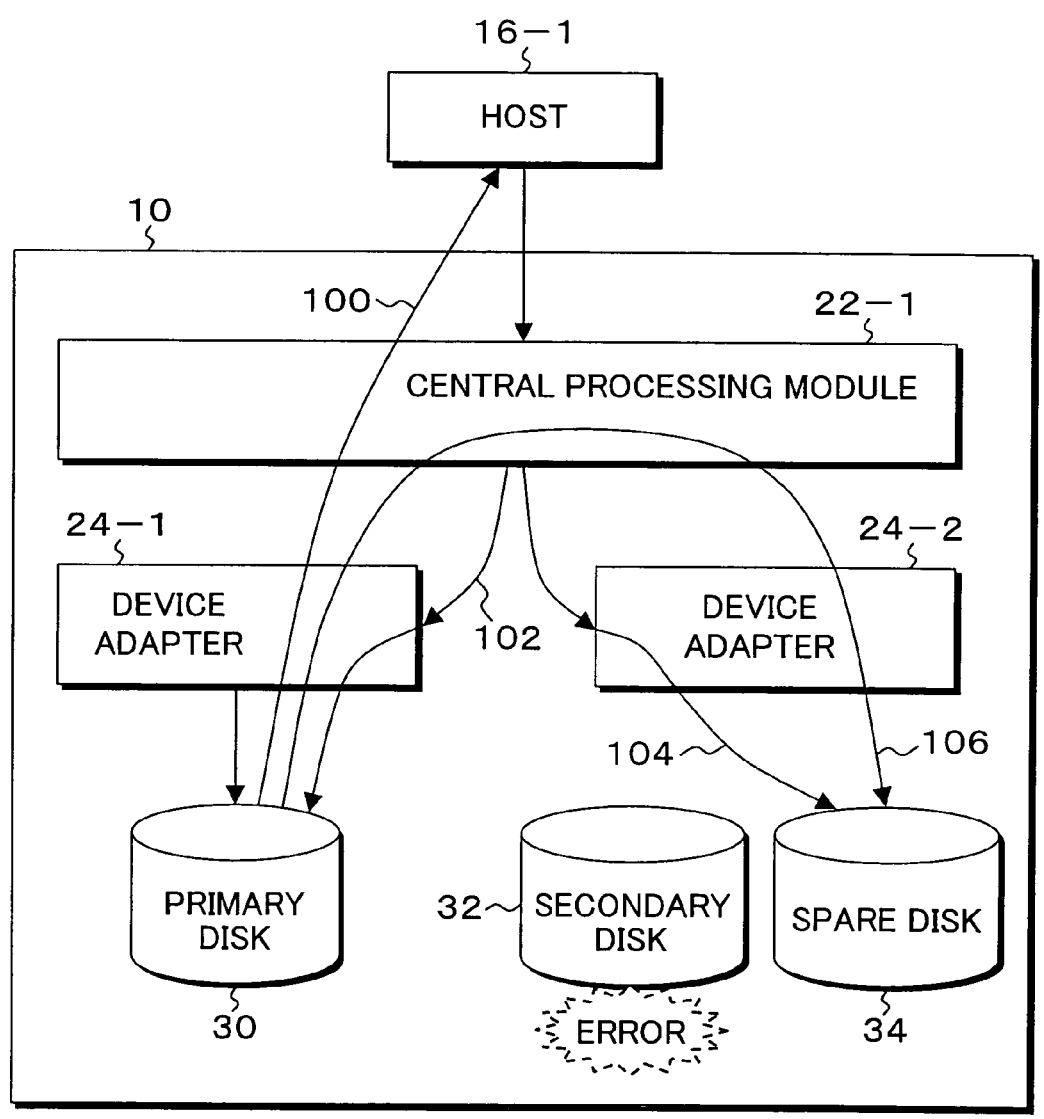
FIG. 16 is an explanatory diagram of the read processing, the write processing, and the data recovery processing in the recovery mode according to the disk array control unit of FIG. 14.

FIG. 16 is a general explanatory diagram of read processing, write processing, and data recovery processing in the recovery mode according to the disk array control unit 12 of FIG. 14. FIG. 16 shows that a read response 100 from the primary disk drive 30, the normal disk drive, is executed when the read request from the host 16-1 is received at the time the secondary disk drive is determined to be the suspect disk drive and the setting of the recovery mode is in progress. A write processing 102 is executed to the primary disk drive 30, namely the normal disk drive, when a write request is received from the host 16-1 while the recovery mode is in progress. The primary disk is the normal disk drive. At the same time, a write 104 is executed to the spare disk drive. On the other hand, in the idle state when no I/O request is made from the host 16-1, the staging of the data of the primary disk drive, namely the normal disk drive, will be carried out on the cache of the central processing module 22-1. After this staging, a rebuild processing 106 in which the data is written to the spare disk 34 is executed.

If an error is determined in the rebuild processing 106, the management table 98 is referred. In referring to the management table 98, if it is confirmed that the address range of the secondary disk drive is valid data, the data is copied to the spare disk 34 from the secondary disk drive 32, namely the suspected disk drive, to the spare disk to recover the data to the spare disk 34.

Figure 17:
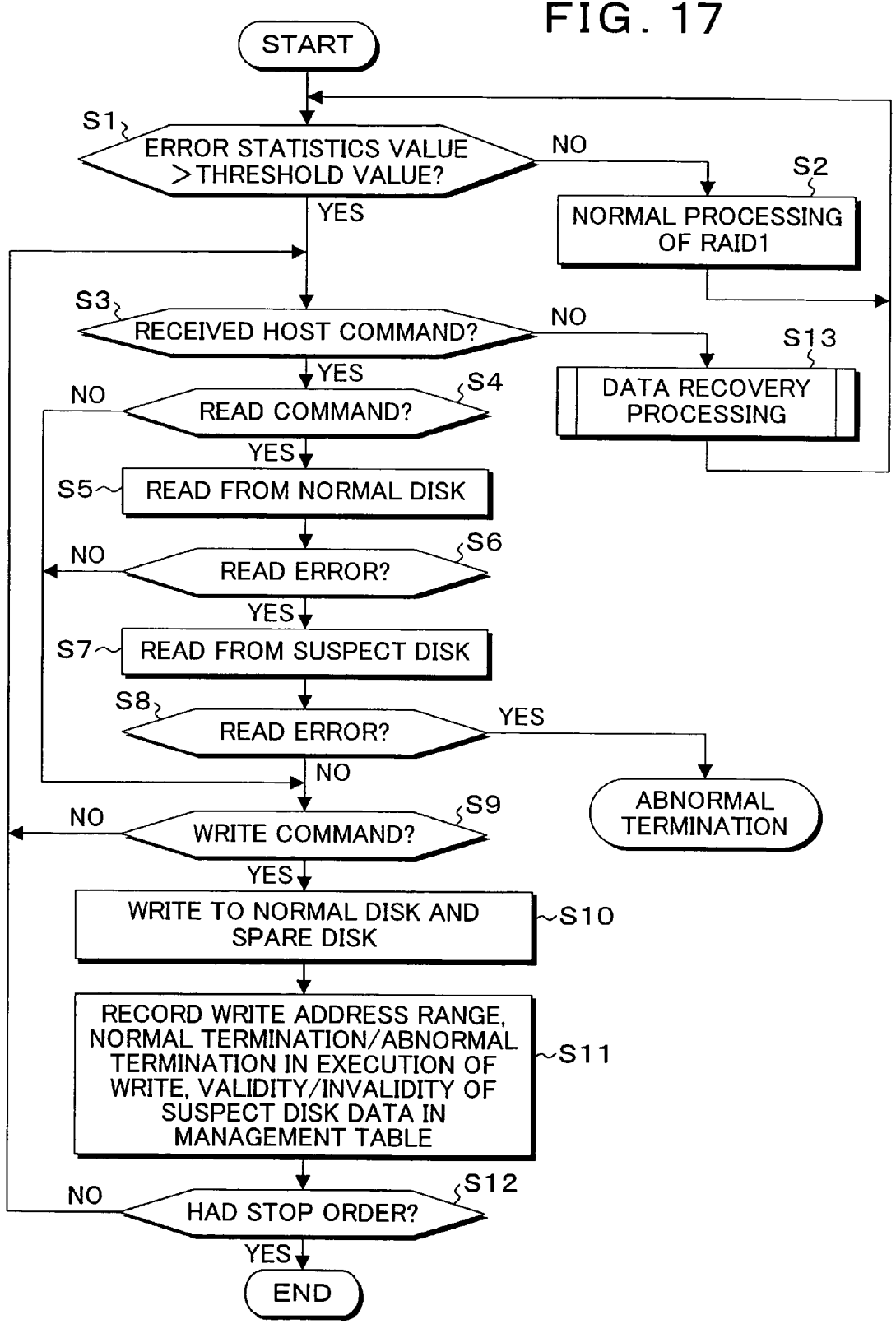
FIG. 17 is a flowchart of the disk array control processing of FIG. 14.
Figure 18:
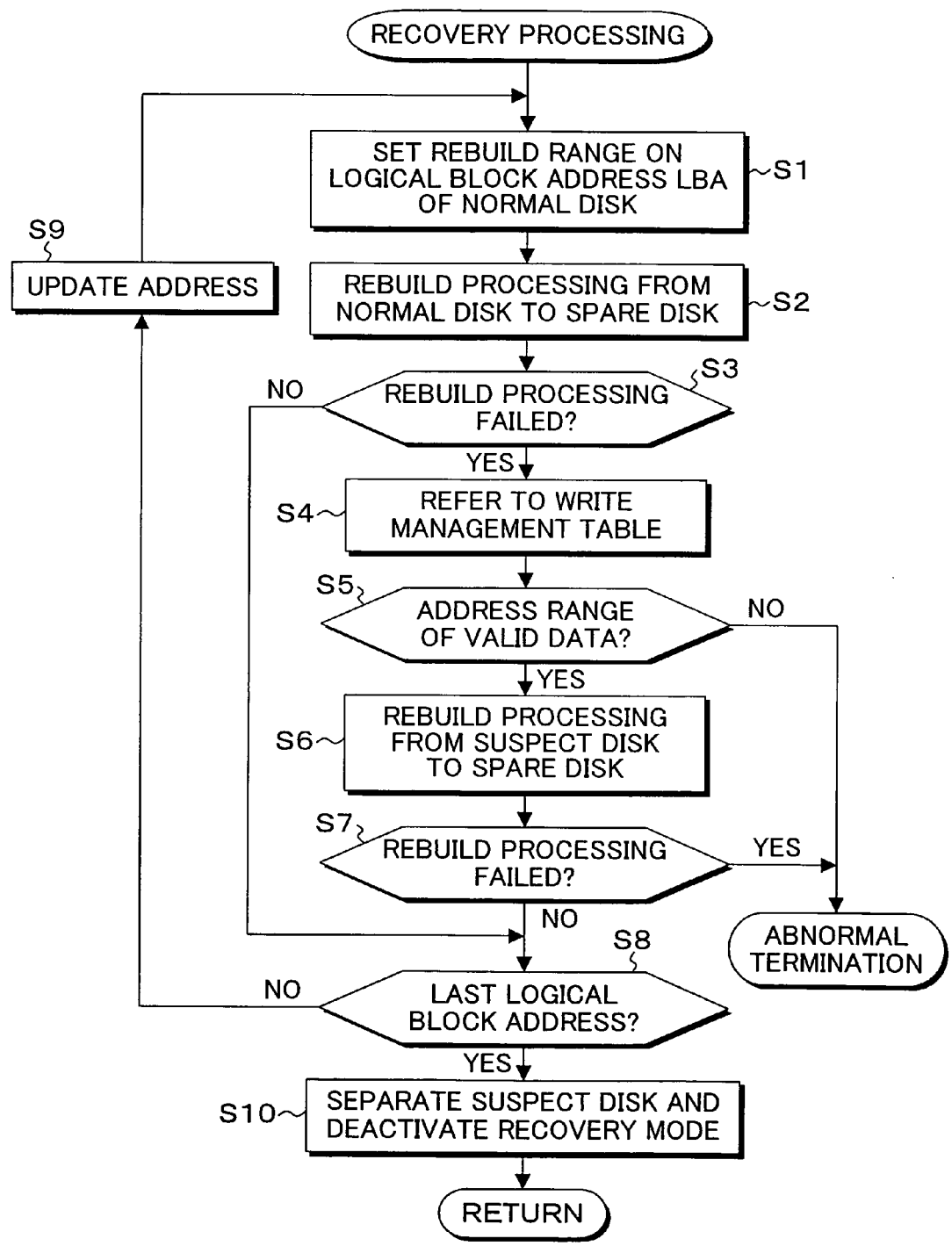
FIG. 18 is a flowchart of the data recovery processing shown in FIG. 17.

FIG. 17 is a flowchart of the disk array control processing of FIG. 14. The processing from steps S1 to S10 shown in FIG. 18 is the same as the processing of the first embodiment of FIG. 6. The processing from steps S1 to S10 is the read processing and the write processing based on the setting of the recovery mode in that it was determined that the addition value of error statistics of one of the disk drives exceeded the threshold value. In contrast to the processing shown in FIG. 6, in a fourth embodiment shown in FIG. 17, the data recovery to the spare disk drive 34 is executed by the rebuild processing. In the rebuild processing, the normal disk takes a main role. At step S10, the write processing is executed to the normal disk drive and the spare disk drive 34. Afterward, the address range based on the write start address and the write end address, normal termination or an abnormal termination, and validity/invalidity of the data in the suspect disk drive are registered to the management table 98 as shown in FIG. 15. If the write processing ended with normal termination, the data in the suspect disk drive will be registered as invalid. If the write processing ends with abnormal termination, the data in the suspect disk drive will be registered as valid. It is to be noted that the data exists in the suspect disk drive in that the address range of the data is not registered to the management table.

FIG. 18 is a flowchart of the data recovery processing of step 13 shown in FIG. 17. FIG. 18 shows that the address range of the rebuild on the logical block address LBA of the normal disk drive is set at step S1. At S2, the rebuild processing from the normal disk drive to the spare disk drive is carried out to recover the data. Presence of failure of the rebuild processing is checked at step S3. The management table 98 is referred to at step S4 when the unlikely event of a failure in the rebuild processing occurs. When it is confirmed at S5 that the data is in the address range of valid data, the processing is moved to step S6; the data is copied from the suspect disk drive to the spare disk drive 34 to recover the data. The processing ends with an abnormal termination when the address range is invalid at step S6 or rebuild processing from the suspect disk drive failed at step S7. At step S8, the check is carried out whether the processing reached the last logical block address or not. The processing is repeated from step S1 until the processing reaches the last logical block address after updating the address at step S9. The suspect disk drive is separated at step S10 when it is determined that the copy address reached the last logical block address and the suspect disk drive is replaced with the spare disk drive 68. The recovery mode is deactivated and the processing is returned to the RAID5 regular processing.

Figure 19:
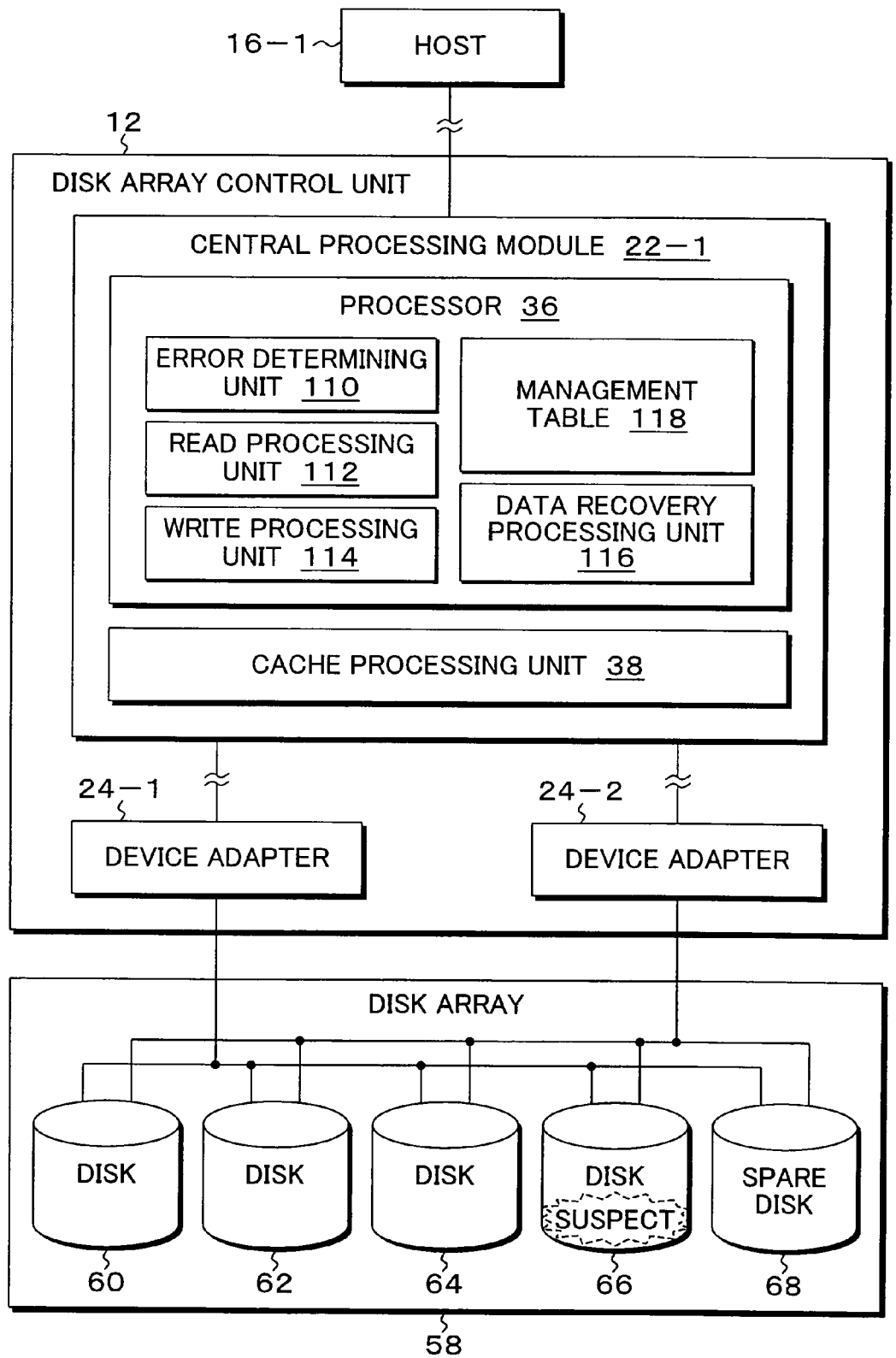
FIG. 19 is a block diagram of a fourth embodiment of the disk array control unit according to the invention for the redundancy configuration of RAID5.

FIG. 19 is a block diagram of a fourth embodiment of the disk array control unit according to the invention. This fourth embodiment adopts the redundancy configuration of RAID5. In the data recovery to the spare disk drive, the normal disk takes a main role. This making the normal disk have a main role in the recovery processing is a characteristic of this embodiment. In FIG. 19, the central processing module 22-1 in the disk array control unit 12 is provided with the processor 36, the cache processing 38. As a way of example, four disk drives 60, 62, 64, and 66 are connected to the central processing module 22-1 via the device adapters 24-1, 24-2 as the disk array 58 making up the RAID5 redundant configuration. The spare disk 68 is also provided as a hot standby. In this example, the explanation will be presented using the case in that the disk drive 66 is determined as the suspect disk drive because the addition value of error statistics of the disk drive 66 exceeds the threshold value and the recovery mode is set.

The processor 36 is provided with an error determining unit 110, a read processing unit 112, a write processing unit 114, a data recovery processing unit 116, and a management table 118. When one of the disk drives of the disk drives 60, 62, 64, and 66 making up the redundancy configuration of RAID5 exceeds the predetermined threshold, the error determining unit 110 makes a decision for the disk drive whose addition value of error statistics exceeded the threshold as a suspect disk drive. After making the decision, the error determining unit 110 sets a recovery mode to recover the data from the suspect disk drive to the spare disk drive 68 located under the same device adapter 24-2 with the suspect disk drive. In this example, the disk drive 66 is determined to be the suspect disk drive. In case a read command is received from the host 16-1 while the setting of the recovery mode is in progress, and in case the read object includes the data from the disk drive 66 that is being the suspect disk drive, the read processing unit 112 calculates the data of the disk drive 66 by taking the exclusive-OR based on the data and parity read from the disk drives 60, 62, and 64 that are normal disks, as shown in FIG. 9B and FIG. 9C and responds with the result. In the processing described above, in case the read processing failed in the reading of the disk drives 60, 62, and 64 that are normal disk drives, the read processing unit 112 checks with the management table 118 whether the data in the disk drive 66, namely the suspect drive, is valid or not. If the validity of the data was of the disk drive 66 is confirmed, the read processing 112 read the date and responds. In case a write command is received from the host 16-1 while the recovery mode setting is in progress, and the write command specifies the data in the disk drive 66, namely the suspect disk drive, the write processing unit 114 calculates the data of the disk drive 66 by taking the exclusive-OR based on the old data and old parity read from the disk drives 60, 62, and 64 that are normal disks and recovers the data of the disk drive 66. Additionally, the write processing units 114 calculates new parity taking exclusive-Or based on the old parity read from the old data of the suspect disk drive which was recovered, a new data received from the host 16-1, and old parity read from the normal disks. Write processing unit 114 also writes into the spare disk drive 68. Additionally, parity is written into the corresponding normal disk drive. Additionally, the write start address and the write end address, namely address range, normal termination or abnormal termination of the write processing, and the validity/invalidity of the data of the suspect disk are registered to the management table 118 based on the result of the write processing. The data recovery processing unit 116 specifies the address range of the normal disk drives sequentially when no access is made from the host 16-1 while the setting of the recovery mode is in progress. While specifying the address range sequentially, the recovery processing unit 116 rebuilds the data into the spare disk drive 68 to recover the data. In case the rebuild recovery processing from the normal disks failed, and it was confirmed by referring to the management table 118 that the failed address range is included within the address range for the valid data of the suspect disk drive, the data recovery unit 116 copies the data in the suspect disk drive into the spare disk drive 68 to recover the data. Accordingly, the maintenance of the redundancy processing is kept in the rebuild processing to the spare disk 68, too.

Figure 20:
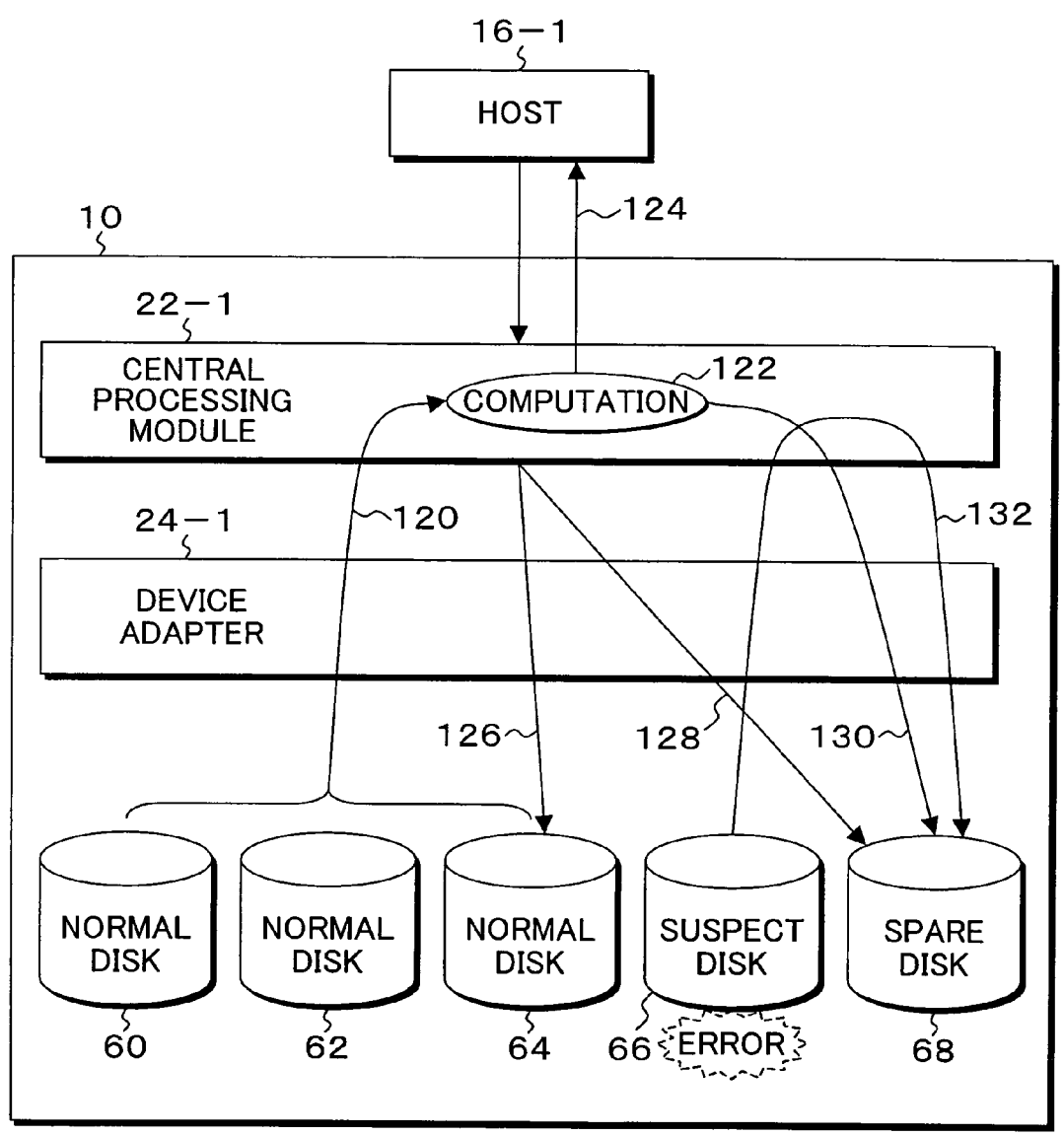
FIG. 20 is an explanatory diagram of the read processing, the write processing, and the data recovery processing in the recovery mode according to the disk array control unit of FIG. 19.
Figure 21:
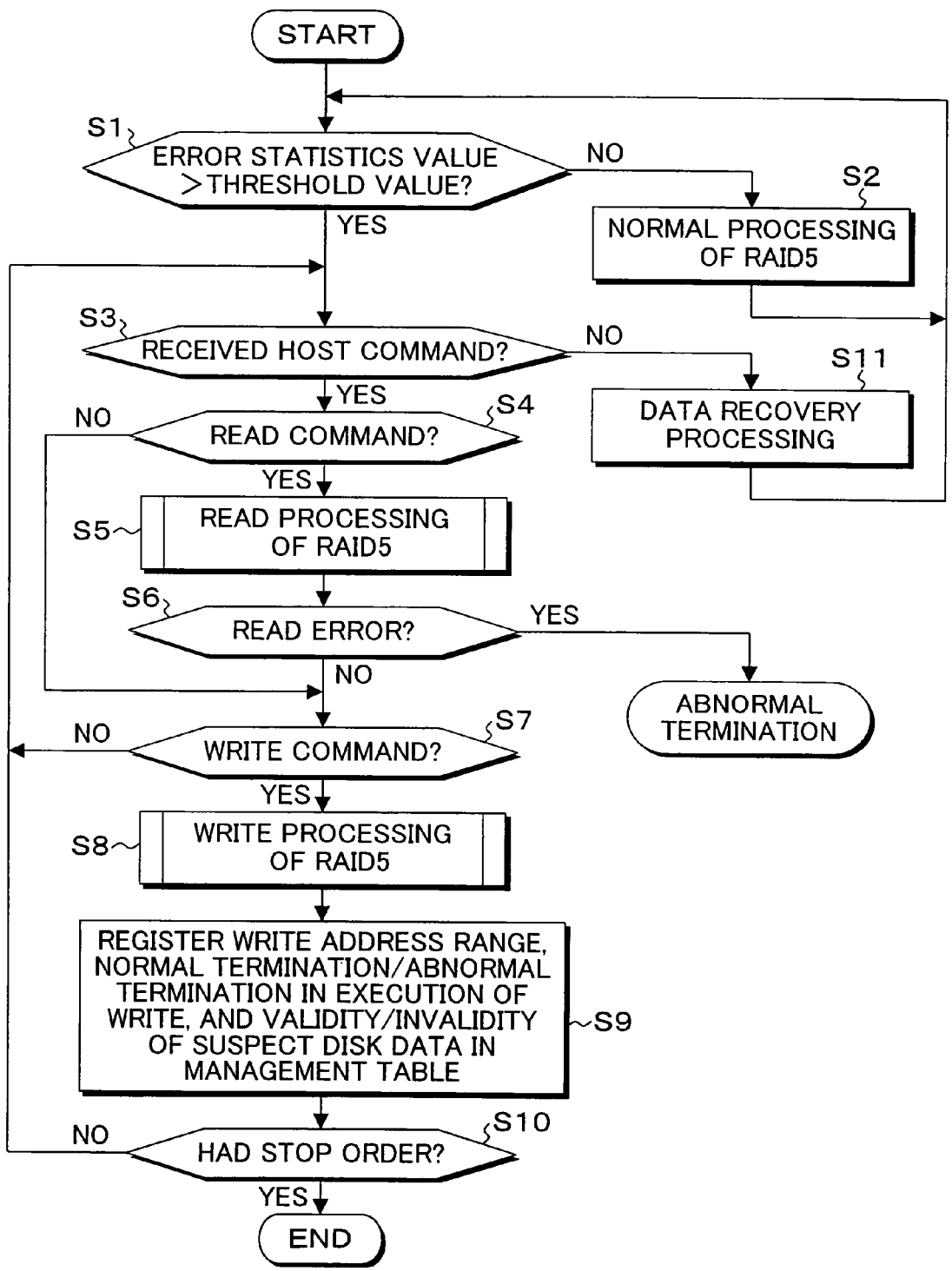
FIG. 21 is a flowchart of the disk array control processing of FIG. 19.

FIG. 20 is an overview of the read processing, the write processing, and the data recovery processing in the recovery mode according to the disk array control unit of FIG. 19. FIG. 21 shows that when a read request to the suspect disk drive 66 from the host 16-1 is received while the setting for the recovery mode is in progress, the exclusive-Or is taken based on the data staging 120 read from the normal disk drives 60, 62, and 64. A computation 124 calculates the data of the suspect disk drive from the exclusive-Or to recover the data. Upon the recovery of the data, a read response 124 is executed. Additionally, when a write request was received from the host 16-1 specifying the suspect disk drive 66 as an object while the recovery mode setting was in progress, in the same way as the case of the read processing, the computation 122 calculates the data from the read data of the exclusive-OR to recover the data. The new parity is calculated taking the data of the suspect disk drive 66; a new data received from the host 16-1; and the exclusive-OR of old parity read from the normal disk drive 60, 62, and 64. A data write 128 writes the new data into the spare disk 68. Additionally, for the new parity, as a way of example, a data write 128 writes into the spare disk 68. Further, for example, a parity write 126 writes the new parity into the corresponding normal disk drives 60, 62, and 64. During the time when no access is received from the host 16-1, the staging 122 develops the data in the suspect disk drive 66 from the exclusive-Or of the read date of the normal disks 60, 62, and 64 on the cache of the central processing module 22-1. The data of the suspect disk drive that went through the staging is calculated by the exclusive-OR to recover the data. A rebuild 130 writes the data into the spare disk drive 68 to recover the data. Additionally, if the staging of the normal disks 60, 62, and 64 fails, and it is confirmed that the data in the address range of the suspect disk drive is valid by referring to the management table 118, a copy 132 is executed. The copy 131 writes the data in the suspect disk drive into the spare disk drive 68.

FIG. 21 is a flowchart of the disk array control unit of FIG. 20. The read processing of RAID5 in the state of the recovery mode setting and the write processing from step S1 to step S8 of RAID5 are the same as step S1 to step S8 of the second embodiment shown in FIG. 10. On the other hand, after executing the write processing of RAID5 at step S8, the address range, normal termination or an abnormal termination of the write processing, and the validity or invalidity of the data contained in the suspect disk drive is registered at the management table 118 for the suspect disk drive based on the result of the write processing at step S9.

Figure 22:
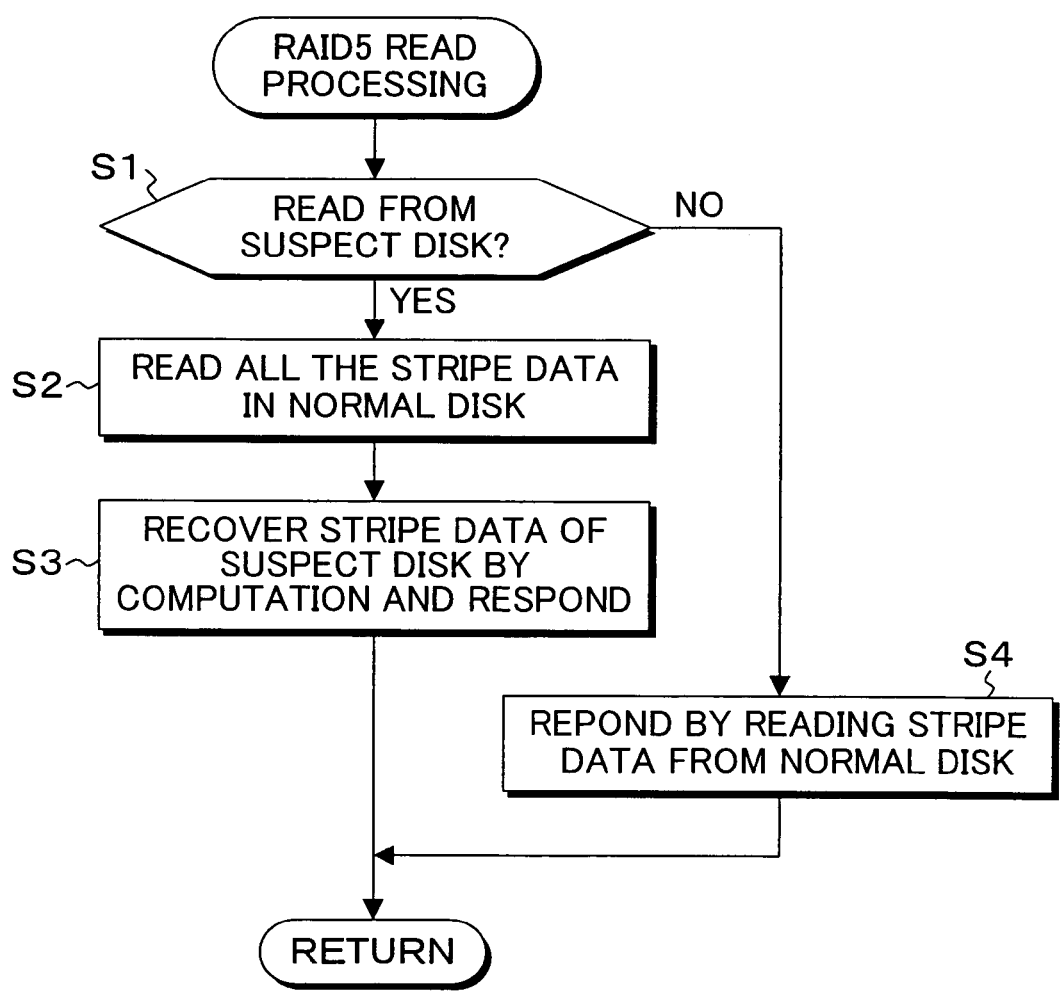
FIG. 22 is a flowchart of the RAID5 read processing shown in FIG. 21.
Figure 23:
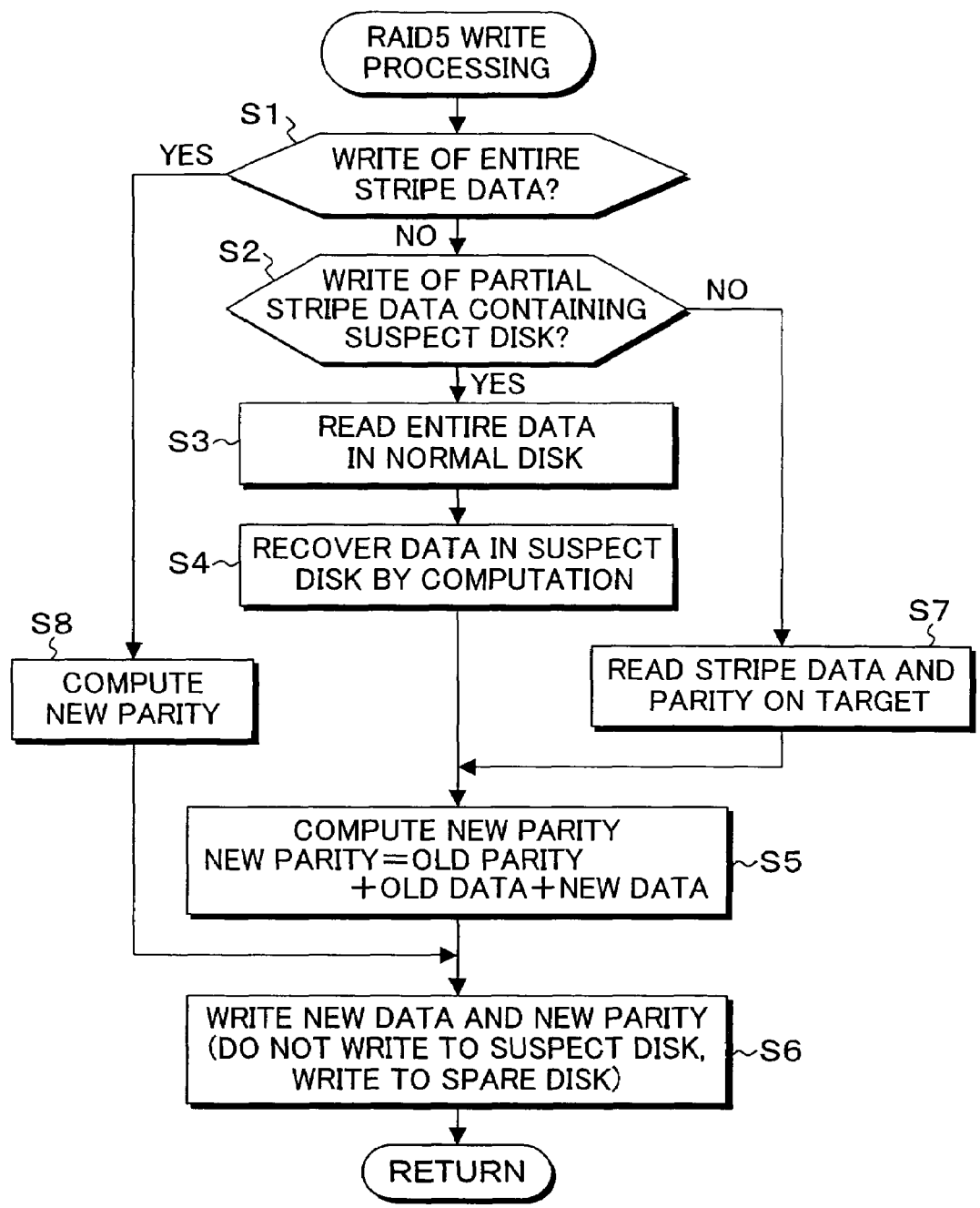
FIG. 23 is a flowchart of the RAID5 write processing shown in FIG. 21.

The read processing of RAID5 at step S5 in FIG. 21 becomes as a flowchart shown in FIG. 22. This is the same as the second embodiment shown in FIG. 11. The write processing of RAID5 at step S8 in FIG. 21 is shown in a flowchart of FIG. 23. This is the same as the RAID5 write processing shown in the second embodiment in FIG. 12.

FIG. 24 is a flowchart of the data recovery processing of step 11 shown in FIG. 21. In FIG. 24, the address range that becomes the rebuild range for the normal disk drives in the logical block address LBA is set in step S1. Afterward, staging of the stripe data of the normal disk drives is executed at step S2. After the staging, the stripe date of the suspect disk drive is regenerated by calculating the exclusive-OR. The rebuild processing is executed by writing the regenerated data into the spare disk drive. Presence of failure of the rebuild processing is checked at step S3 successively. The management table 118 is referred to at step S4 when the unlikely event of a failure in the rebuild processing occurs. In case it is confirmed that the failed address range exists in the suspect disk drive as the valid data, the processing is moved to step S6. At step S6, the copy processing is executed from the suspect disk drive into the spare disk drive. The processing ends with an abnormal termination in case the data in the suspect disk drive is invalid at step S5 or the copy processing from the suspect disk drive at step S7 is determined to be a failure. The check on whether the processing reached the last logical block address or not is executed at step S8. The processing is repeated from step S1 until the processing reaches the last logical block address after updating the address at step S9. The suspect disk drive is separated at step S10 when it is determined that the copy address reached the last logical block address, and the suspect disk drive is replaced with the spare disk drive. The recovery mode is deactivated and the processing is returned to the RAID5 regular processing.

Additionally, the invention provides the program executed by the central processor provided with the disk control unit 12. The corresponding flowchart for each of the first embodiment, the second embodiment, the third embodiment, and the fourth embodiment shows the processing procedure of the program.

Additionally, the hardware resources of the computer in which the program of the invention is executed are composed of CPU in the processor 36 of the disk array control unit, RAM, and hard disk drive. The program of the invention is loaded on the hard disk drive. When the computer starts, the program is read from the hard disk drive and developed on RAM, and the program is executed by CPU.

While the invention was described with the embodiments using number, it is not limited thereto, but encompasses proper modifications which will not detract the purposes and the advantages.

The following additional notes are summaries of the characteristics of the invention in enumeration.

What is claimed is:

1. A computer-readable storage medium which stores a program for allowing a computer to execute:
    an error determining step that determines a suspect disk drive when an addition value of error statistics of a disk drive included in a disk array of a redundancy configuration exceeds a predetermined threshold value and sets a recovery mode to recover data from the suspect disk to a spare disk drive located under the same device adapter with the suspect disk drive;
    a read processing step that reads data from a normal disk drive, which is any disk of the disk array excluding the suspect disk drive, and responds in case a read command was received from a host while the setting of the recovery mode was in progress and reads data from the suspect disk drive and responds in case the read from the normal disk drive failed;
    a write processing step that writes data into the normal disk drive, the suspect disk drive, and the spare disk drive in case a write command was received while the setting of the recovery mode was in progress, and registers a write failure address range to a management table if the write failure was determined for the suspect disk drive;
    a recovery processing step that specifies an address range of the suspect disk drive while the setting of the recovery mode is in progress and at the same time starts to copy the data in the suspect disk drive sequentially to the spare disk drive to recover the data and rebuilds the data in the normal disk drive located under a different device adapter to the spare disk drive to recover the data when the address range corresponds to the write failure address range of the management table or the recovery processing from the suspect disk drive to the spare disk drive failed and separates the suspect disk drive upon the completion of the recovery and replaces the suspect disk drive with the spare disk drive.

2. The storage medium according to claim 1:
    wherein the disk array has a RAID1 redundancy configuration provided with a primary disk drive and a secondary disk drive that store the same data;

wherein the error determining step determines a primary disk drive or a secondary disk drive to be the suspect disk drive when the addition value of error statistics of the primary disk drive or the secondary disk drive exceeds the predetermined threshold value and sets the recovery mode to recover the data from the suspect disk drive to the spare disk drive located under the same device adapter with the suspect disk drive;

wherein the read processing step reads the data from the normal disk drive excluding the suspect disk drive and responds when a read command is received from the host while the setting of the mode recovery is in progress and reads the data from the suspect disk drive when reading from the normal disk fails;

wherein the write processing step writes the data into the normal disk drive, the suspect disk drive, and the spare disk drive when a write command is received from the host while the setting of the recovery mode is in progress and the write processing step registers the write failure address range to the write management table when the-a write failure of the suspect disk was determined; and wherein the recovery processing step specifies the address range of the suspect disk drive during a time when no access is made from the host while the setting of the recovery mode is in progress and at the same time starts the processing to copy the data to the spare disk sequentially to recover the data, and rebuilds the data to the spare disk drive from the normal disk drive located under a different device adapter to recover the data when the address range corresponds to the write failure address range of the management table or the recovery processing from the suspect disk drive into the spare disk drive fails, and the recovery processing step separates the suspect disk drive upon completion of the recovery and replaces the suspect drive with the spare disk drive.

3. The storage medium according to claim 1 wherein the disk array has a RAID5 redundancy configuration provided with plural disk drives that store plural stripe data and a parity to the same address, and causes to change position of the disk that stores the parity at every address;

wherein the error determining step determines one of the disk drives as the suspect disk drive when the addition value of error statistics of one of the disk drives exceeds the predetermined threshold value, and sets the recovery mode to recover the data to the spare disk drive located under the same device adapter with the suspect disk drive;

wherein the read processing step calculates read data of the suspect disk drive based on the data and the parity read from the normal disk and responds with the calculated read data when a read command for the suspect disk drive is received from the host while the setting of the recovery mode is in progress, and reads from the suspect disk drive and responds with the read data in case reading from the normal disk fails;

wherein the write processing step recovers old data of the suspect disk drive based on the old data and/or old parity read from the normal disks in case a write command for the suspect disk drive is received from the host while the setting of the recovery mode is in progress, and the write processing step additionally calculates a new parity based on the old data of the suspect disk drive, new data, and old data; and the write processing step writes the new parity to the suspect disk drive and the spare disk drive as well as the normal disk that corresponds to the new parity; and the write processing step registers the write failure address to the management table in case a write failure of the suspect disk was determined; and wherein the recovery processing step specifies the address range of the suspect disk drive during the time when the setting of the recovery mode is in progress and no access is made from the host;

at the same time, the recovery processing step starts the processing to copy the data to the spare disk sequentially to recover the data;

the recovery processing step calculates the data of the suspect disk drive based on the data and parity read from the normal disk drives and rebuilds and recovers the data in case the address range corresponds to the write failure address range of the management table or the recovery processing from the suspect disk drive into the spare disk drive fails; and upon the completion of the recovery, the recovery processing step separates the suspect disk drive and replaces the suspect disk drive with the spare disk drive.

4. A computer-readable storage medium which stores a program for allowing a computer to perform a method comprising:

an error determining step that determines a suspect disk drive when an addition value of error statistics of a disk included in a storage system of redundancy configuration exceeds a predetermined threshold value, and sets a recovery mode to recover data from the suspect disk drive to a spare disk under the same device adapter with the suspect disk drive;

a write processing step that writes the data to normal disk drives, which are disk drives of the storage system excluding the suspect disk drive, and the spare disk drive when a write command is received from a host while the setting of the recovery mode is in progress and additionally registers a normal termination or an abnormal termination of a processing on the normal disk drives and validity or invalidity of writing on the suspect disk drive to the management table in correspondence with a write address range;

a read processing step that reads data from the normal disks and responds with the data when a read command is received from the host during the time the setting of the recovery mode is in progress and confirms the address range of the suspect disk drive being within the valid address range from the management table and read the data from the suspect disk drive and responds with the data;

a recovery processing step that specifies an address range of the normal disk drives located under a different device adapter sequentially when no access is made from the host during the time when setting of the recovery mode is in progress and at the same time starts a processing to rebuild the data to the spare disk drive to recover the data;

the recovery processing step confirms an address range of the suspect disk drive being within a valid address range at the management table and copies the data of the suspect disk drive to the spare disk drive and recovers the data in case the rebuild recovery processing fails; and the recovery processing separates the suspect disk drive and replaces the suspect disk drive with the spare disk drive.

5. The storage medium according to claim 4, wherein the storage system has a redundancy configuration of RAID1 provided with a primary disk drive and a secondary disk drive storing the same data, and the error determining step determines one of the primary disk drive and the secondary disk drive to be the suspect drive in case the addition value of error statistics of the primary disk or the secondary disk exceeds the predetermined threshold value; and the error determining step sets the recovery mode to recover the data from the suspect disk drive to the spare disk drive located under the same device adapter;

wherein the write processing step writes the data to a normal disk drive and the spare disk drive when a write command is received from the host while the setting of the recovery mode is in progress, and additionally registers the normal termination or the abnormal termination of the processing of the normal disk drives and the validity or the invalidity of the data of the suspect disk drive to the management table to correspond with the write address range;

wherein the read processing step reads the data from the normal disk drives excluding the suspect disk drive in case a read command is received from the host during the time when the setting of the recovery mode is in progress;

the read processing step reads the data from the suspect disk drive in case the read processing step fails in reading the data from the normal disk drive and responds with the data obtained from the suspect disk drive;

the read processing step reads the data from normal disks which are disks of the storage system excluding the suspect disk drive, and responds in case a read command is received from the host during the time the setting of the recovery mode is in progress;

the read processing step confirms with the management table that the address range of the data of the suspect disk drive is within a valid address range and responds for the read command with the data from the suspect disk drive;

wherein the recover processing step specifies an address range of the normal disk sequentially during the time when the setting of the recovery mode is in progress and when no access is made;

the recover processing step then starts a processing to rebuild the data to the spare disk and to recover the data;

the recovery processing step confirms that the address range of the data of the suspect disk is within the valid address range of the management table, and copies the data in the suspect disk to the spare disk to recover the data in case the recovery processing fails, the recovery processing separates the suspect disk drive and replaces the suspect disk drive with the spare disk drive.

6. The storage medium according to claim 4, wherein the storage system has a RAID5 redundancy configuration provided with plural disk drives that store plural stripe data and parity, and that cause a location of a disk storing the parity to change at every stripe position;

wherein the error determining step determines one of the plural disk drives as the suspect disk drive when the addition value of error statistics of one of the disk drives exceeds the predetermined threshold value, and sets the recovery mode to recover the data to the spare disk drive located under the same device adapter with the suspect disk drive;

the write processing step recovers old data of the suspect disk drive or old parity based on the old data and/or old parity read from the normal disk drives in case a write command for the suspect disk drive is received from the host while the setting of the recovery mode is in progress, and additionally calculates a new parity based on new data recovered from the suspect disk drive and the old parity, writing the new data and parity into the normal disk drive and the spare disk drive, and, additionally, in correspondence with the write address range, check whether the processing of the normal disk drives ended with the normal termination or ended with the abnormal termination and registers the result to the management table;

also the write processing registers validity or invalidity of the suspect disk drive to the management table;

wherein the read processing step calculates the read data of the suspect disk drive based on the data and the parity read from the normal disk and responds with the calculated read data when a read command for the suspect disk drive is received from the host while the setting of the recovery mode is in progress; and confirms that the address range of the suspect disk drive is valid in case the read from the normal disk drives fails and reads the data from the suspect disk drive after the confirmation and responds with the read data;

wherein the recovery processing step specifies an address range of the normal disk drives sequentially when no access is made from the host during the time when setting of the recovery mode is in progress and at the same time starts the recovery processing in that the recovery processing step calculates the read data of the suspect disk drive based on the read data and parity obtained from the normal disks to rebuild the data to the spare disk drive and to recover the data;

the recovery processing step confirms the address range of the suspect disk drive being within the valid address range at the management table and copies the data of the suspect disk drive to the spare disk drive recovering the data in case the rebuild recovery processing fails; and upon completion of the recovery processing, the recovery processing step separates the suspect disk drive and replaces the suspect disk drive with the spare disk drive.

7. A storage control method for reading and writing data into and from a disk array of a redundancy configuration on the basis of a command from a host, comprising:

an error determining step that sets a recovery mode for recovering data to a spare disk drive located under the same device adapter by determining a disk drive as being a suspect disk drive when an addition value of error statistics of the suspect disk drive included in the disk array of the redundancy configuration exceeds a predetermined threshold value;

a read processing step that reads data from a normal disk drive, which is a disk of the disk array excluding the suspect disk drive and responds in case a read command is received from a host while the setting of the recovery mode is in progress, and reads data from the suspect disk drive and responds in case reading from the normal disk drive fails;

a write processing step that writes data into the normal disk drive, the suspect disk drive, and the spare disk drive in case a write command is received while the setting of the recovery mode is in progress and registers a write failure address range to the management table if the write failure is determined for the suspect disk drive; and a recovery processing step that specifies an address range of the suspect disk drive while the setting of the recovery mode is in progress and at the same time starts copying the data from the suspect disk drive sequentially to the spare disk drive to recover the data and rebuilds the data in the normal disk drive located under a different device adapter than the spare disk drive, to recover the data when the address range corresponds to the write failure address range of the management table or a recovery processing from the suspect disk drive to the spare disk drive fails and separates the suspect disk drive upon completion of the recovery and replaces the suspect disk drive with the spare disk drive.

8. The method according to claim 7, wherein said disk array has a RAID1 redundancy configuration provided with a primary disk drive and a secondary disk drive that store the same data;

wherein said error determining step determines the primary disk drive or the secondary disk drive as being the suspect disk drive when an addition value of error statistics of the primary disk drive or the secondary disk drive exceeds a predetermined threshold value and sets the recovery mode to recover the data from the suspect disk drive to the spare disk drive located under the same device adapter with the suspect disk drive;

wherein said read processing step reads the data from the normal disk drive excluding the suspect disk drive and responds when a read command is received from the host while the setting of the recovery mode is in progress and reads the data from the suspect disk drive when the reading from the normal disk fails;

wherein said write processing step writes the data into the normal disk drive, the suspect disk drive, and the spare disk drive when a write command is received from the host while the setting of the recovery mode is in progress and the write processing step registers the write failure address range to the write management table when the write failure of the suspect disk drive is determined; and wherein said recovery processing step specifies an address range of the suspect disk drive during a time when no access is made from the host while the setting of the recovery mode is in progress, and at the same time starts to copy the data to the spare disk drives sequentially to recover the data and rebuild the data to the spare disk drive from a normal disk drive located under a different device adapter to recover the data when the address range corresponds to the write failure address range of the management table or the recovery processing from the suspect disk drive into the spare disk drive fails, and the recovery processing step separates the suspect disk drive upon the completion of the recovery and separates the suspect disk drive with the spare disk drive.

9. The method according to claim 7, wherein said disk array has a RAID1 redundancy configuration provided with a plurality of disk drives that store a plurality of stripe data and parity to the same address and causes to change a position of a disk that stores the parity at every address;

wherein the error determining step determines any of the disk drives as being the suspect disk drive when the addition value of error statistics of any of the disk drives exceeds a predetermined threshold value and sets the recovery mode to recover the data to the spare disk drive located under the same device adapter with the suspect disk drive;

wherein the read processing step calculates read data of the suspect disk drive based on the data and the parity read from the normal disk drive and responds with the calculated read data when the read command for the suspect disk drive is received from the host while the setting of the recovery mode is in progress, and reads from the suspect disk drive and responds with the read data in case the read from the normal disk drive fails;

wherein the write processing step recovers the data of the suspect disk drive based on old data and/or old parity read from the normal disks in case a write command for the suspect disk drive is received from the host, while the setting of the recovery mode is in progress; and wherein the write processing additionally calculates a new parity based on the old data of the suspect disk drive, new data, and old data;

the write processing step writes the new parity to the suspect disk drive and the spare disk drive as well as the normal disk that corresponds to the new parity; and the write processing step registers the write failure address to the management table in case the write failure of the suspect disk is determined; and wherein the recovery processing step specifies an address range of the suspect disk drive during a time when the setting of the recovery mode is in progress and no access is made from the host, and, at the same time, the recovery processing step starts to copy the data to the spare disk sequentially to recover the data;

the recovery processing step calculates the data of the suspect disk drive based on data and parity read from the normal disk drives and rebuilds and recovers the data in case the address range corresponds to the write failure address range of the management table or the recovery processing from the suspect disk drive into the spare disk drive fails; and wherein, upon the completion of the recovery, the recovery processing step separates the suspect disk drive and replaces with the spare disk drive.

10. A storage control method that reads and writes data from and into a storage system having a redundancy configuration on the basis of a command from a host, comprising:

an error determining step that sets a recovery mode for recovering data to a spare disk drive located under the same device adapter by determining a disk drive included in the storage system of the redundancy configuration as being a suspect disk drive when an addition value of error statistics of said suspect disk drive exceeds a predetermined threshold value;

a write processing step that, when a write command from the host is received during a setting of said recovery mode, writes the data into said normal disk drive and the spare disk drive, and registers a normal termination or an abnormal determination of a write processing of said normal disk drive in correspondence with a write address range and registers validity or invalidity of the data of said suspect disk drive into a management table;

a read processing step, when a read command is received from the host during the setting of said recovery mode, reads and responds the data from normal disk drives other than the suspect disk drive, and when read from said normal disk drive fails, confirms that a read address is within a valid address range from said management table to read and respond the data of said suspect disk drive; and a recovery processing step that, when no access is made from the host during the setting of said recovery mode, starts processing of rebuilding and recovering the data to the spare disk drive while sequentially specifying address ranges of said normal disk drives located under a different device adapter, and when said rebuilding-recovering processing fails, confirms that the address is within a valid address range according to said management table, recovers the data of said suspect disk drive by copying the same into said spare disk drive, and upon completion of the recovery, recovers the data of said suspect disk drive by copying the same into said spare disk drive, separates said suspect disk drive and replaces the same with the spare disk drive.

11. The method according to claim 10,
wherein said storage system has a RAID1 redundancy configuration provided with a primary disk drive and a secondary disk drive storing the same data;
wherein said error determining step sets the recovery mode for recovering the data to a spare disk drive located under the same device adapter by determining said primary disk drive or said secondary disk drive as being the suspect disk drive when the addition value of error statistics of said primary disk drive or said secondary disk drive exceeds a predetermined threshold value;
wherein said write processing step writes data into said normal disk drive and said spare disk drive when a write command is received from the host during setting of said recovery mode;
registers a normal termination or an abnormal termination of a write processing of the normal disk drive in correspondence with the write address range and registers validity or invalidity of data of the suspect disk drive in the management table;
wherein said read processing step
reads data from normal disk drives other than the suspect disk drive when a read command is received from the host during setting of said recovery mode for response;
reads data from said suspect disk drive for response when read of said normal disk drive fails;
reads data for response from a normal disk drive other than the suspect disk drive for response when a read command is received from the host during setting of said recovery mode;
reads data of said suspect disk drive for response by confirming that an address is within a valid address range from said management table when read of said normal disk drive fails;
starts a processing of recovering data by rebuilding the same into the spare disk drive while sequentially specifying address ranges of said normal disk drives located under another device adapter when no access is made from the host during setting of said recovery mode;
recovers the data of said suspect disk drive through copying into said spare disk drive by confirming that an address is within a valid address range of said management table when said rebuilding-recovering processing fails; and
separates said suspect disk drive and switches over the same to the spare disk drive upon completion of recovery.

12. The method according to claim 10,
wherein said storage system has a RAID5 redundancy configuration storing a plurality of stripe data and parities thereof and provided with a plurality of disk drives changing position of a disk storing parity data at every stripe position;
wherein said error determining step determines any of said disk drives as being a suspect disk drive when an addition value of error statistics thereof exceeds a predetermined threshold value, and sets a recovery mode for recovering the data into a spare disk located under the same device adapter;
wherein said write processing step recovers old data or old parities of said suspect disk drive on the basis of the old data and/or the old parities read from the normal disk drive when a write command is received from the host to said suspect disk drive during setting of said recovery mode;
further calculates new parities on the basis of new data and the new parities of the recovered suspect disk drive, and writes the new data and parities into the normal disk drive and the spare disk drive; and
further registers a normal termination or an abnormal termination of a write processing of the normal disk drive and validity or invalidity of data of the suspect disk drive into the management table in correspondence with the write address range;
wherein said read processing step calculates for response the read data of said suspect disk drive on the basis of the data and parities read from the normal disk drive when a read command is received from the host to said suspect disk drive during setting of said recovery mode; and
reads for response the data of said suspect disk drive by confirming that an address is within a valid address range from said management table when read of said normal disk drive fails; and
wherein said recovery processing step starts a recovery processing of calculating read data of said suspect disk drive and rebuilds the same into the spare disk drive on the basis of the data and the parities read while sequentially specifying an address ranges of said normal disk drives when no access is made from the host during setting of said recovery mode; and
recovers the data of said suspect disk drive through copying into said spare disk drive by confirming that the address is within a valid address range of said management table when said rebuilding-recovering processing fails; and
separates said suspect disk drive and switches over the same to the spare disk drive upon the completion of recovery.

13. A storage system that reads and writes data into a disk array of a redundancy configuration on the basis of a command from a host, comprising:
an error determining unit that sets a recovery mode for recovering data into a spare disk drive located under the same device adapter by determining a disk drive as being a suspect disk drive when an addition value of error statistics of a disk drive included in the disk array of the redundancy configuration exceeds a predetermined threshold value;
a read processing unit that, when a read command is received from the host during setting of said recovery mode, reads for response data from a normal disk drive which is a disk drive of the disk array other than the suspect disk drive, and when reading of said normal disk drive fails, reads the data from said suspect disk drive for response;
a write processing unit that, when a write command is received from the host during setting of said recovery mode, writes the data into said normal disk drive, the suspect disk drive and said spare disk drive, and when write into said suspect disk drive is determined to be a failure, registers a write failure address range in the management table; and
a recovery processing unit that, when no access is made from the host during setting of said recovery mode, starts a processing of recovering by sequentially copying the data from the suspect drive into the spare disk drive while specifying an address range of said suspect disk drive, and when said address range falls under the write failure address range of said management table or when a recovery processing from said suspect disk drive into the spare disk drive fails, rebuilds and recovers the data of said normal disk drive into said spare disk drive, and upon completion of recovery, separates said suspect disk drive, and switches over the same to the spare disk drive.

14. The system according to claim 13;
wherein said disk array has a RAID1 redundancy configuration provided with a primary disk drive and a secondary disk drive storing the same data;
wherein said error determining unit determines, when an addition value of error statistics of said primary disk drive or said secondary disk drive exceeds a predetermined threshold value, the respective disk drive as being the suspect disk drive, and sets a recovery mode for recovering the data into a spare disk drive located under the same device adapter;
wherein said read processing unit reads and responds data from a normal disk drive other than the suspect disk drive when a read command is received from the host during setting of said recovery mode; and
reads for response data from said suspect disk drive when read of said normal disk drive fails;
wherein said write processing unit writes the data into said normal disk drive, the suspect disk drive and the spare disk drive when a write command is received from the host during setting of said recovery mode; and
registers a write failure address range into the write management table when write of said suspect disk drive is determined to be a failure; and
wherein said recovery processing unit starts processing of recovering by sequentially copying data into the spare disk drive while specifying an address range of said suspect disk drive when no access is made from the host during setting of said recovery mode;
recovering by rebuilding data of said normal disk drive located under another device adapter into said spare disk drive when said address range falls under the write failure address range of said management table, or when recovery processing into the spare disk drive fails; and
separates said suspect disk drive upon the completion of recovery to switch over to the spare disk drive.

15. The system according to claim 13;
wherein said disk array has a RAID5 redundancy configuration storing a plurality of stripe data and parities thereof at the same address and provided with a plurality of disk drives changing position of a disk storing the parities for each address;
wherein said error determining unit determines any of said disk drives as being the suspect disk drive when the addition value of error statistics of any of said disk drives exceeds the predetermined threshold value, and sets the recovery mode for recovering the data into the spare disk drive located under the same device adapter;
wherein said read processing unit calculates for response read data of said suspect disk drive on the basis of data and parity read from the normal disk drive when a read command is received from the host to said suspect disk drive during setting of said recovery mode; and
reads for response data from said suspect disk drive when read of said normal disk drive fails;
wherein said write processing unit recovers old data of said suspect disk drive on the basis of the old data and/or old parities read from the normal disk drive when a write command into said suspect disk drive is received from the host during setting of said recovery mode;
calculates new parities on the basis of the old data, new data and old parities of the recovered suspect disk drive;
writes said new data into said suspect disk drive and the spare disk drive, and writes the new parities into the corresponding normal disk drive;

registers the write failure address range in the write management table when writing of said suspect disk drive is a failure; and
wherein said recovery processing unit starts processing of recovering through sequential copying of the data into the spare disk drive while specifying the address range for said suspect disk drive when no access is made from the host during setting of said recovery mode;
calculates data of said suspect disk drive on the basis of the data and the parities read from the normal disk drive when said address range falls under the write failure address range of said management table, or when the recovery processing from the suspect disk drive to the spare disk drive fails, rebuilding the same into said spare disk drive for recovery; and
separates said suspect disk drive upon the completion of recovery, and switches over the same to the spare disk drive.

16. A storage system that reads and writes data based on commands from the host to the-plural disk drives having a redundancy configuration comprising:
an error determining unit that determines one of the disk drives as a suspect disk drive when an addition value of error statistics of the one of the disk drives exceeds a predetermined threshold value and sets a recovery mode to recover data from the suspect disk drive to a spare disk drive located under the same device adapter with the suspect disk drive;
a write processing unit that writes the data from the suspect disk drive to normal disk drives and the spare disk drive when a write command is received from the host while the setting of the recovery mode is in progress and additionally, in correspondence with a write address range, registers normal termination or abnormal termination of writing on the normal disk drives and validity or invalidity of the data of the suspect disk drive to the management table;
a read processing unit that reads the data from the normal disk drives which are among the plural disk drives excluding the suspect disk drive and responds with the data in case a read command is received from the host during a time the setting of the recovery mode is in progress and confirms that an address range of the suspect disk drive is within the valid address range from the management table and reads the data from the suspect disk drive and responds with the data in case reading from the normal disk drive fails;
a recovery processing unit that specifies an address range of the normal disk drives located under a different device adapter sequentially when no access is made from the host during the time when setting of the recovery mode is in progress and at the same time starts a processing to rebuild the data to the spare disk drive to recover the data, confirms the address range of the suspect disk drive is within the valid address range at the management table and copies the data of the suspect disk drive to the spare disk drive to recover the data in case the rebuild recovery processing fails, upon the completion of the recovery, the recovery processing unit separates the suspect disk drive and replaces the suspect disk drive with the spare disk drive.

17. The system according to claim 16, the plural disk drives having a RAID1 redundancy configuration provided with a primary disk drive and a secondary disk drive that store the same data;
wherein the error determining unit determines a primary disk drive or a secondary disk drive to be the suspect disk drive in case the additional value of error statistics of the primary disk drive or the secondary disk drive exceeds the predetermined threshold value and sets the recovery mode to recover the data from the suspect disk drive to the spare disk drive located under the same device adapter with the suspect disk drive;

wherein the write processing unit writes into the normal disk drive and the spare disk drive in case a write command was received from the host while the recovery mode is in progress, additionally, the write processing unit registers normal termination or abnormal termination of a write processing of the normal disk drive and the validity or invalidity of the data of the suspect disk drive to the management table in correspondence with the write address range;

wherein the read processing unit reads the data from the normal disk drives excluding the suspect disk drive in case a read command is received from the host during a time when the selling of the recovery mode is in progress and responds, the read processing reads the data from the suspect disk drive in case the read processing step fails in reading the data from the normal disk drive and responds, the read processing unit reads the data from the normal disks excluding the suspect disk drive and responds in case a read command is received from the host during the time the setting of the recovery mode is in progress, the read processing unit confirms with the management table that the address range of the data of the suspect disk drive is within the valid address range and read the data of the suspect disk drive and responds;

wherein the recover processing unit specifies an address range of the normal disk drive located under a different device manager sequentially during the time when the selling of the recovery mode is in progress and when no access is made, and at the same time the recover processing unit starts the processing to rebuild the data to the spare disk drive to recover the data, the recovery processing unit confirms with the management table that the address range of the data of the suspect disk is within the valid address range and copies the data from the suspect disk to the spare disk to recover the data in case the rebuild processing fails, the recovery processing unit separates the suspect disk drive and replaces the suspect disk drive with the spare disk drive.

18. The system according to claim 16, the storage system having a RAID5 redundancy configuration provided with the plural disk drives that store plural stripe data and parity and that cause location of a disk storing the parity data to change at every stripe position wherein the error determining unit determines one of the disk drives as the suspect disk drive when the addition value of error statistics of one of the disk drives exceeds the predetermined threshold value and sets the recovery mode to recover the data from the suspect disk drive to the spare disk drive located under the same device adapter with the suspect disk drive;

wherein the write processing unit recovers old data of the suspect disk drive or old parity based on the old data and/or old parity read from the normal disk drives in case a write command for the suspect disk drive is received from the host while the setting of the recovery mode is in progress, and additionally calculates a new parity based on new data recovered from the suspect disk drive and the old parity, writing the new data and parity into the normal disk drive and the spare disk drive, and additionally in correspondence with a write address range the write processing unit registers normal termination or abnormal termination of the write processing of the normal disk drive and the write processing unit also registers the validity or invalidity of the suspect disk drive to the management table;

wherein the read processing unit calculates read data of the suspect disk drive based on the data and the parity read from the normal disk and responds with the calculated read data in case a read command for the suspect disk drive is received from the host while the setting of the recovery mode is in progress and confirms the validity of an address range of the suspect disk drive in case the read from the normal disk drives fails and reads from the suspect disk drive and responds with the read data;

wherein the recovery processing unit specifies the address range of the normal disk drives sequentially in case no access is made from the host during the time when setting of the recovery mode is in progress and at the same time starts the recovery processing in that the recovery processing unit calculates the read data of the suspect disk drive based on the read data and parity obtained from the normal disks to rebuild the data to the spare disk drive and to recover the data;

the recovery processing unit confirms an address range of the suspect disk drive being within the valid address range with the management table and copies the data of the suspect disk drive to the spare disk drive recovering the data in case the rebuild recovery processing fails;

upon the completion of the recovery processing, the recovery processing unit separates the suspect disk drive and replaces the suspect disk drive with the spare disk drive.

19. A storage system for reading and writing data into a disk array of a redundant configuration based on a command from a host, the storage system comprising:

an error determining unit setting a recovery mode for recovering data from a suspect disk drive into a spare disk drive when an error occurs in the suspect disk drive included in the disk array of the redundancy configuration; and a recovery processing unit for starting a processing of recovering by copying the data from the suspect disk drive into the spare disk drive while specifying an address range of the suspect disk drive when no access is made from the host during setting of the recovery mode, and when a recovery processing from the suspect disk drive into the spare disk drive fails, rebuilding and recovering the data from a normal disk drive which is disk of the disk array other than the suspect disk drive into the spare disk drive, and upon completion of recovery, separating the suspect disk drive, and switching from the suspect disk drive to the spare disk drive.

* * * * *

UNITED STATES PATENT AND TRADEMARK OFFICE
CERTIFICATE OF CORRECTION

PATENT NO. : 7,529,965 B2　　　　　　　　　　　　　　　　　　　　　　Page 1 of 1
APPLICATION NO. : 11/102802
DATED : May 5, 2009
INVENTOR(S) : Kazuhiko Ikeuchi et al.

It is certified that error appears in the above-identified patent and that said Letters Patent is hereby corrected as shown below:

Column 25, Line 20, change "the-a" to --a--.

Column 34, Line 20, after "to" change "the-plural" to --plural--.

Column 35, Line 19, change "selling" to --setting--.

Column 35, Line 34, change "selling" to --setting--.

Signed and Sealed this

Twenty-first Day of July, 2009

JOHN DOLL
*Acting Director of the United States Patent and Trademark Office*